United States Patent
Inoue et al.

(10) Patent No.: US 7,038,684 B2
(45) Date of Patent: May 2, 2006

(54) RENDERING PROCESS APPARATUS CAPABLE OF IMPROVING PROCESSING SPEED OF OVERALL GRAPHIC SYSTEM

(75) Inventors: Yoshitsugu Inoue, Hyogo (JP); Hiroyuki Kawai, Hyogo (JP); Junko Kobara, Hyogo (JP); Yoshiyuki Kato, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 347 days.

(21) Appl. No.: 10/200,253

(22) Filed: Jul. 23, 2002

(65) Prior Publication Data

US 2003/0112251 A1 Jun. 19, 2003

(30) Foreign Application Priority Data

Dec. 19, 2001 (JP) .............................. 2001-386129

(51) Int. Cl.
  *G06F 15/00* (2006.01)
  *G06T 15/00* (2006.01)
  *G09G 5/36* (2006.01)
(52) U.S. Cl. ...................... 345/501; 345/522; 345/559
(58) Field of Classification Search ................ 345/501, 345/503, 522, 419–420, 426, 441, 468, 559
See application file for complete search history.

(56) References Cited

U.S. PATENT DOCUMENTS 5,563,995 A * 10/1996 Shirouzu .................... 345/441
5,877,769 A * 3/1999 Shinohara ................... 345/419
6,118,453 A * 9/2000 Suzuki et al. ............... 345/426
6,373,491 B1 * 4/2002 Sasaki ........................ 345/443
6,522,337 B1 * 2/2003 Morioka ..................... 345/582

FOREIGN PATENT DOCUMENTS

JP  9-305777  11/1997
JP  10-188002  7/1998

OTHER PUBLICATIONS

J.D. Foley et al., "Computer Graphics: Principle and Practice", Second Edition, Addison-Wesley Publishing Company, Nov. 1992, pp. 72-75, 668-672, 866-871, 876, 882-886.
Jackie Neider et al., "Open GL Programming Guide (Japanese Edition)", by Open GL Architecture Review Board;, Addison-Wesley Publishers Japan, 1993, pp. 30-31, 36-37 (with English Translation).

* cited by examiner

*Primary Examiner*—Kee M. Tung
*Assistant Examiner*—Joni Hsu
(74) *Attorney, Agent, or Firm*—McDermott Will & Emery LLP

(57) ABSTRACT

An input section inputs vertex data from a host CPU or a geometry process section to a rendering main process section. The rendering main process section performs a rendering process in accordance with the vertex data inputted into the input section. Therefore, the host CPU can directly write the vertex data, which does not require a geometry process, to a rendering process apparatus and a processing speed of an overall graphics system can be thereby improved.

15 Claims, 19 Drawing Sheets

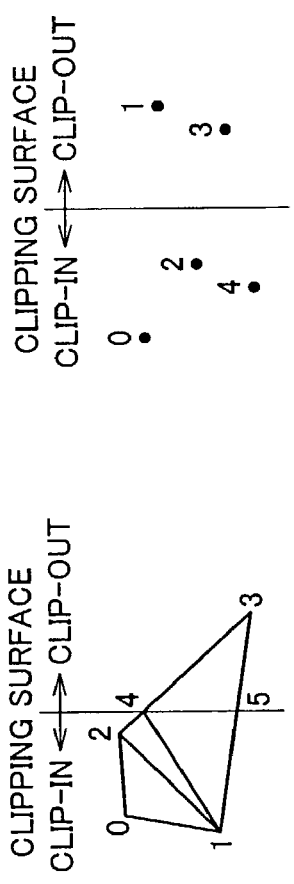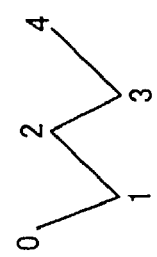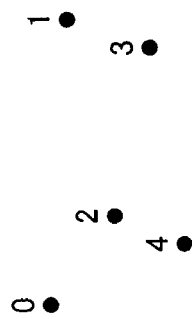

FIG.17
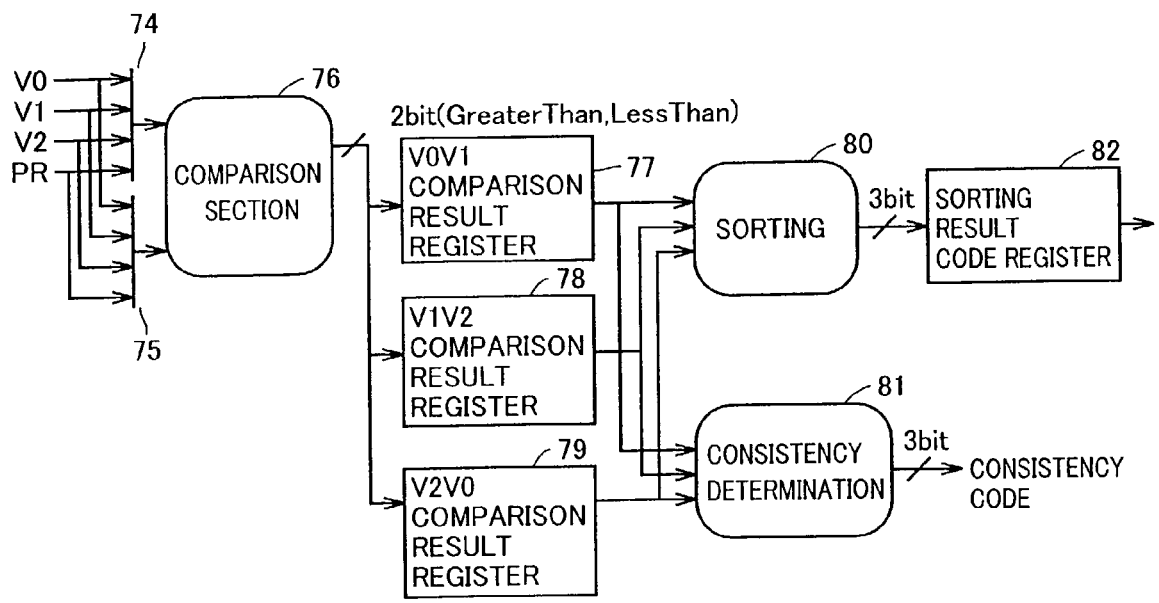
FIG.18
| COORDINATE VALUE MAGNITUDE RELATIONSHIP | SORTING RESULT CODE |
|---|---|
| V0≦V1≦V2 | 000 |
| V0≦V2<V1 | 001 |
| V1<V0≦V2 | 010 |
| V1≦V2<V0 | 011 |
| V2<V0≦V1 | 100 |
| V2<V1<V0 | 101 |
FIG.19
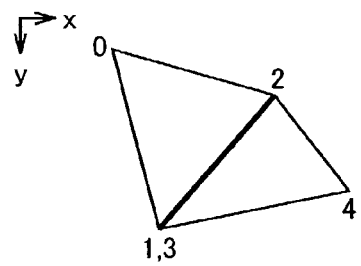

FIG.22

| | T1 | T2 | T3 | T4 | T5 | T6 | T7 | T8 | T9 | T10 | T11 | T12 | T13 | T14 | T15 | T16 | T17 | T18 | T19 | T20 | T21 | T22 | T23 | T24 | T25 |
|---|---|---|---|---|---|---|---|---|---|---|---|---|---|---|---|---|---|---|---|---|---|---|---|---|---|
| clock | | | | | | | | | | | | | | | | | | | | | | | | | |
| IN_READY | | | | | | | | | | | | | | | | | | | | | | | | | |
| ge_deta0 | cr0 | x0 | z0 | u0 | x1 | z1 | u1 | x2 | z2 | u2 | x3 | z3 | u3 | x4 | | | | z4 | u4 | | | | | | |
| ge_deta1 | | y0 | | v0 | y1 | | v1 | y2 | | v2 | y3 | | v3 | y4 | | | | | v4 | | | | | | |
| X_PR | | | x0 | | | x1 | | | x2 | | | x3 | | | | | | x4 | | | | | | | |
| Y_PR | | | y0 | | | y1 | | | y2 | | | y3 | | | | | | y4 | | | | | | | |
| Z_PR | | | | z0 | | | z1 | | | z2 | | | z3 | | | | | | z4 | | | | | | |
| U_PR | | | | u0 | | | u1 | | | u2 | | | u3 | | | | | | u4 | | | | | | |
| V_PR | | | | v0 | | | v1 | | | v2 | | | v3 | | | | | | v4 | | | | | | |
| X_V0 | | | | | x0 | | | | | | | | | | | | | x3 | | | | | | | |
| Y_V0 | | | | | y0 | | | | | | | | | | | | | y3 | | | | | | | |
| Z_V0 | | | | | z0 | | | | | | | | | | | | | z3 | | | | | | | |
| U_V0 | | | | | u0 | | | | | | | | | | | | | u3 | | | | | | | |
| V_V0 | | | | | v0 | | | | | | | | | | | | | v3 | | | | | | | |
| X_V1 | | | | | | | | x1 | | | | | | | | | | | | | x4 | | | | |
| Y_V1 | | | | | | | | y1 | | | | | | | | | | | | | y4 | | | | |
| Z_V1 | | | | | | | | z1 | | | | | | | | | | | | | z4 | | | | |
| U_V1 | | | | | | | | u1 | | | | | | | | | | | | | u4 | | | | |
| V_V1 | | | | | | | | v1 | | | | | | | | | | | | | v4 | | | | |
| X_V2 | | | | | | | | | | | x2 | | | | | | | | | | | | | | |
| Y_V2 | | | | | | | | | | | y2 | | | | | | | | | | | | | | |
| Z_V2 | | | | | | | | | | | z2 | | | | | | | | | | | | | | |
| U_V2 | | | | | | | | | | | u2 | | | | | | | | | | | | | | |
| V_V2 | | | | | | | | | | | v2 | | | | | | | | | | | | | | |
| GO_RC | | | | | | | | | | | | | | | | | | | | | | | | | |
| RC_BUSY | | | | | | | | | | | | | | | | | | | | | | | | | |
| SURFACE U COORDINATE SUBTRACTION SECTION SUBTRACTER OUTPUT | | | | | | | | | | u0-u1 | | u1-u2 | u2-u0 | | | | u2-u3 | u3-u1 | | | u3-u4 | u4-u2 | | | |
| V0-V1 REGISTER | | | | | | | | | | | u0-u1 | | | | | | | u3-u1 | | | | u3-u4 | | | |
| V1-V2 REGISTER | | | | | | | | | | | | u1-u2 | | | | | | | | | | | u4-u2 | | |
| V2-V0 REGISTER | | | | | | | | | | | | | u2-u0 | | | | u2-u3 | | | | | | | | |
| V0-V1 | | | | | | | | | | | u0-u1 | | | | | | | u3-u1 | | | | u3-u4 | | | |
| V1-V2 | | | | | | | | | | | | u1-u2 | | | | | | | | | | | u4-u2 | | |
| V2-V0 | | | | | | | | | | | | | u2-u0 | | | | u2-u3 | | | | | | | | |

RENDERING PROCESS APPARATUS CAPABLE OF IMPROVING PROCESSING SPEED OF OVERALL GRAPHIC SYSTEM

BACKGROUND OF THE INVENTION

1. Field of the Invention

The present invention relates to a rendering process apparatus for a computer graphics system, and particularly relates to a rendering process apparatus capable of improving the processing efficiency of primitive rendering.

2. Description of the Background Art

In recent years, a computer graphics system which processes three-dimensional images at high speed has been utilized in a car navigation system, a game machine or the like in order to output precise images with presence.

The computer graphics system is divided into a geometry process section and a rendering process section. The geometry process section performs a coordinate transformation and a lighting process to vertexes which constitute a primitive such as a line or a triangle, and generates vertex data (xyz coordinate data, color data and texture coordinate data). The rendering process section performs a process to the primitive which consists of a plurality of vertex data applied from the geometry process section (J. D. Foley and the like, "Computer Graphics: Principles and Practice", pp. 866–871, pp. 876, 1992, Addison-Wesley Publishing Company).

The rendering process section obtains the rendering position of the primitive in a display memory device, interpolates data on the regions between the vertexes applied from the geometry process section, and allocates pixel data to the display memory device by a method corresponding to the type of the primitive (J. D. Foley and the like, "Computer Graphics: Principles and Practice", pp. 72–75, pp. 668–672 and pp. 882–886, 1992, Addison-Wesley Publishing Company).

If a rendering process is performed to a primitive having a complex shape such as a polygon or a circle, rendering quality cannot be maintained uniformly because of the coordinate transformation and, furthermore, the rendering process becomes complex. For such a primitive having a complex shape, therefore, a primitive data group obtained by dividing the primitive into triangles is constructed, thereby simplifying the process performed by the rendering process section and making rendering quality uniformly (OpenGL Architecture Review Board, "OpenGL Programming Guide (Japanese Edition)", pp. 30–31, 1993, Addison-Wesley Publishers Japan).

In a conventional computer graphics system, a geometry process section and a rendering process section are connected in series and a pipeline process is thereby performed. Due to this, even if a database can be constructed by primitives each of which has been already subjected to a coordinate transformation and a lighting process or a primitive which does not require a geometry process itself is to be rendered, coordinate data is always applied to the rendering process section through the geometry process section and the geometry process section performs an unnecessary determination process or the like. There has been a problem that this disadvantage makes it impossible to improve the processing efficiency of the overall computer graphics system.

Furthermore, since the rendering process section starts processes after all the vertex data constituting a primitive are obtained, there has also been a problem that overhead required to transfer the vertex data disadvantageously deteriorates processing efficiency.

In addition, the rendering process section processes a line strip, a triangle strip, a triangle fan and the like which are used as the types of the primitives constituting a rendering object (OpenGL Architecture Review Board, "OpenGL Programming Guide (Japanese Edition)", pp. 36–37, 1993, Addison-Wesley Publishers Japan) in independent, basic point, line and triangle units, respectively. This makes it necessary for a host CPU (Central Processing Unit) or the geometry process section to issue a rendering instruction to the rendering process section while managing the order of vertexes so that the primitive has a primitive format which the rendering process section can process. As a result, there has been a problem that the processing performance of the overall computer graphics system is disadvantageously deteriorated.

SUMMARY OF THE INVENTION

It is an object of the present invention to provide a rendering process apparatus which can reduce processing load imposed on a host CPU or a geometry process unit and which can improve the processing speed of an overall graphics system.

It is another object of the present invention to provide a rendering process apparatus which can reduce the processing load of a rendering process and which can improve the processing speed of an overall graphics system.

According to one aspect of the present invention, a rendering process apparatus which is connected to a host processor and a geometry process apparatus, includes: a rendering main process section performing a rendering process in accordance with vertex data; an input section selectively inputting vertex data from the host processor and the geometry process section to the rendering process section; and an input control section controlling output of the vertex data inputted into the input section, and controlling the rendering process performed by the rendering main process section.

Since the input section selectively inputs the vertex data from the host processor and that from the geometry process section to the rendering process section, the host processor can directly write vertex data which does not require a geometry process, to the rendering process apparatus, and processing speed can be thereby improved.

According to another aspect of the present invention, a rendering process apparatus includes: a rendering main process section performing a rendering process in accordance with vertex data; an input section inputting vertex data from an outside to the rendering process section; and an input control section controlling output of the vertex data inputted into the input section, and controlling the rendering process performed by the rendering main process section, wherein the input section has: a pending register holding the vertex data inputted from the outside; and a plurality of vertex registers to which the vertex data held in the pending register is transferred.

The input section has the pending register and a plurality of vertex registers. Due to this, even if the rendering main process section is performing a rendering process, it is possible to input vertex data on a primitive to be rendered next.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9A shows that triangle strips are clipped, FIG. 9B shows that points are clipped, FIG. 9C shows that the rendering process performed to the line strings, and FIG. 9D shows the rendering process performed to the points;

FIG. 17 is a block diagram showing schematic configurations of an X coordinate comparison section 66 and a Y coordinate comparison section 72 shown in FIG. 16;

FIG. 18 shows one example of sorting result codes outputted from a sorting section 80;

FIG. 19 shows triangle strips rendered by a rendering process apparatus in a fifth embodiment according to the present invention;

FIG. 22 is a timing chart for rendering process section 3 in the sixth embodiment according to the present invention when the triangle strips shown in FIG. 4A are rendered.

DESCRIPTION OF THE PREFERRED EMBODIMENTS

First Embodiment

Figure 1:
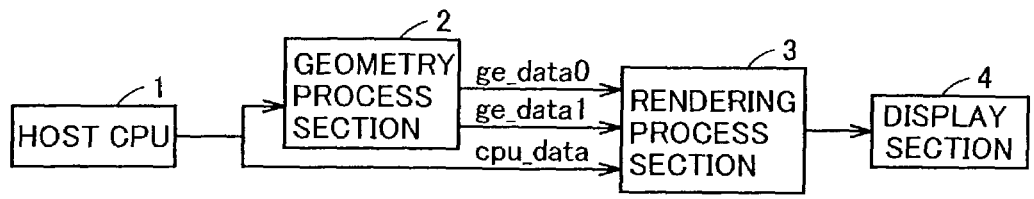
FIG. 1 is a block diagram showing a schematic configuration of a graphics system in a first embodiment according to the present invention.

FIG. 1 is a block diagram showing a schematic configuration of a graphics system in a first embodiment according to the present invention. This graphics system includes a host CPU 1, a geometry process section 2, a rendering process section 3 and a display section 4. Geometry process section 2 and rendering process section 3 are connected to host CPU 1 by one data bus cpu_data. Geometry process section 2 and rendering process section 3 are connected to each other by two data buses ge_data0 and ge_data1. While a case where two data buses connect geometry process section 2 to rendering process section 3 will be described in this embodiment, the number of data buses may be one or not less than three.

Geometry process section 2 performs a coordinate transformation to vertex data which constitute a primitive applied from host CPU 1, performs a lighting process for obtaining the colors of the vertexes, and outputs the vertex data to rendering process section 3. In addition, if the vertex data does not require a geometry process, e.g., a database consists of rendering objects already subjected to a geometry process, then host CPU 1 directly outputs the data to rendering process section 3. Rendering process section 3 outputs image data after the rendering process to display section 4. Display section 4 displays the image data output from rendering process section 3.

Figure 2:
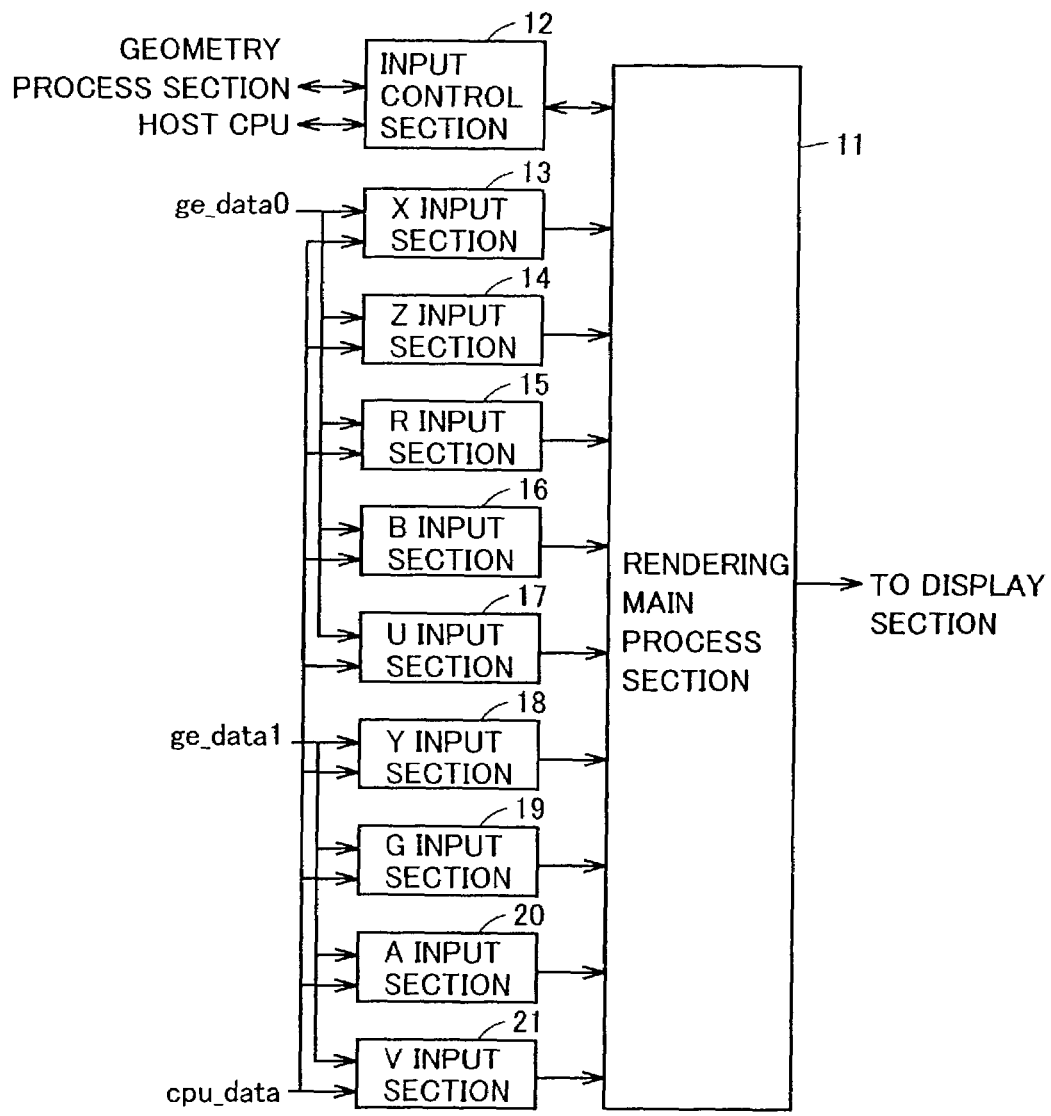
FIG. 2 is a block diagram showing a schematic configuration of a rendering process section 3.

FIG. 2 is a block diagram showing a schematic configuration of rendering process section 3. Rendering process section 3 includes a rendering main process section 11 which performs a rendering process based on the vertex data received from geometry process section 2 or host CPU 1, an input control section 12 which controls the input of data from host CPU 1 and geometry process section 2 and input sections 13 to 21 which input data according to elements, respectively.

As input sections for XYZ coordinate, an X input section 13, a Y input section 18 and a Z input section 14 are provided. As input sections for color data, an R input section 15, a G input section 19, a B input section 16 and an A (blending factor) input section 20 are provided. As input sections for texture coordinate, a U input section 17 and a V input section 21 are provided. While the input sections, into which XYZ coordinate values which are three-dimensional coordinates are input, are provided in this embodiment, a W coordinate input section corresponding to a four-dimensional coordinate may be provided in addition to the X, Y and Z input section.

As described above, host CPU 1 is connected to rendering process section 3 by data bus cpu_data. Data bus cpu_data is connected to each of input sections 13 to 21. In addition, geometry process section 2 is connected to rendering process section 3 by two data buses ge_data0 and ge_data1. Data bus ge_data0 is connected to X input section 13, Z input section 14, R input section 15, B input section 16 and U input section 17, while data bus ge_data1 is connected to Y input section 18, G input section 19, A input section 20 and V input section 21. Element data input sections 13 to 21 are the same in configuration.

Figure 3:
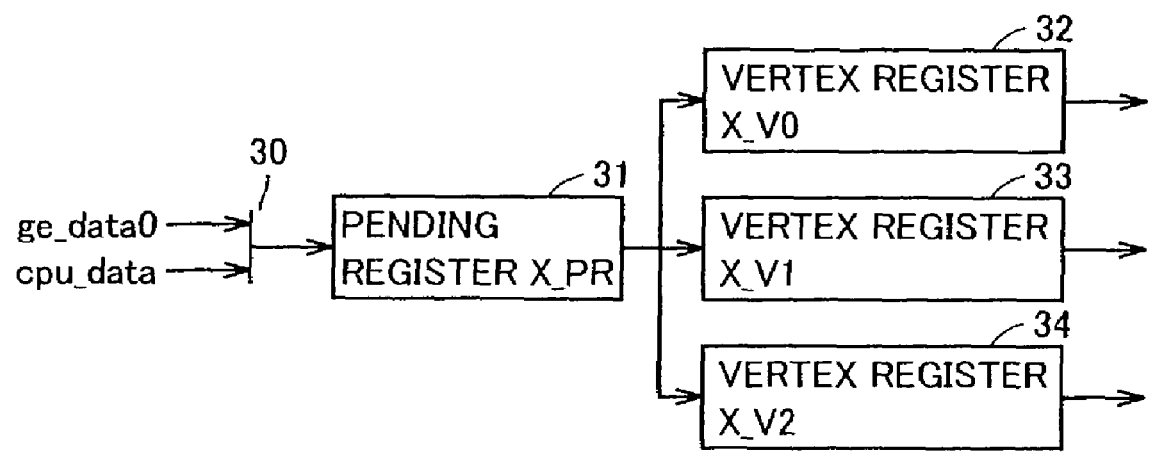
FIG. 3 is a block diagram showing a schematic configuration of an X input section 13 as one example of element data input sections 13 to 21.

FIG. 3 is a block diagram showing the schematic configuration of X input section 13 as one example of element data input sections 13 to 21. X input section 13 includes a selector 30 which selects one of data buses ge_data0 and cpu_data, a pending register X_PR 31 which temporarily holds data received from selector 30, and vertex registers X_V0 (32), X_V1 (33) and X_V2 (34) to which the data held in pending register X_PR 31 is transferred.

The data held in pending register X_PR 31 is transferred to one of three vertex registers X_V0 (32), X_V1 (33) and X_V2 (34). The outputs of respective vertex registers 32 to 34 are connected to rendering main process section 11.

According to the configuration explained above, if host CPU 1 executes an application which does not require a geometry process, vertex data can be directly transferred to rendering process section 3. Therefore, the vertex data is not passed through geometry process section 2 and it is possible to reduce unnecessary latency and to improve the processing speed of the overall graphics system. At this moment, since geometry process section 2 does not operate, it is possible to reduce the power consumption of geometry process section 2.

Further, since geometry process section 2 and rendering process section 3 are connected to each other by a plurality of data buses, it is possible to improve efficiency for data transfer between geometry process section 2 and rendering process section 3 and to thereby improve the processing speed of the overall graphics system.

Figure 4D:
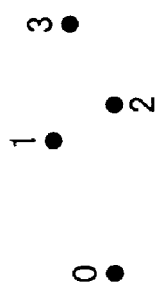
FIGS. 4A to 4D are views for explaining a rendering process of rendering process section 3.
Figure 4C:
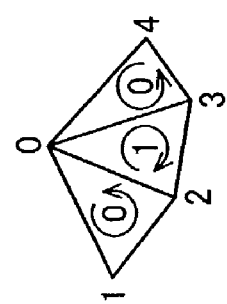
Figure 4B:
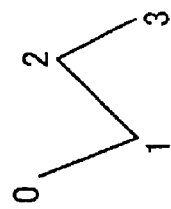
Figure 4A:
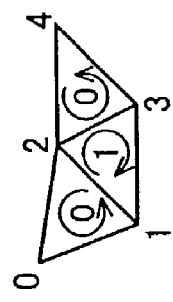

FIGS. 4A to 4D are views for explaining the rendering process of rendering process section 3. FIG. 4A shows the rendering process performed to triangle strips, i.e., shows that three triangles 0-1-2 (counterclockwise), 1-2-3 (clockwise) and 2-3-4 (counterclockwise) are sequentially rendered. FIGS. 4B to 4D will be described later.

Figure 5:
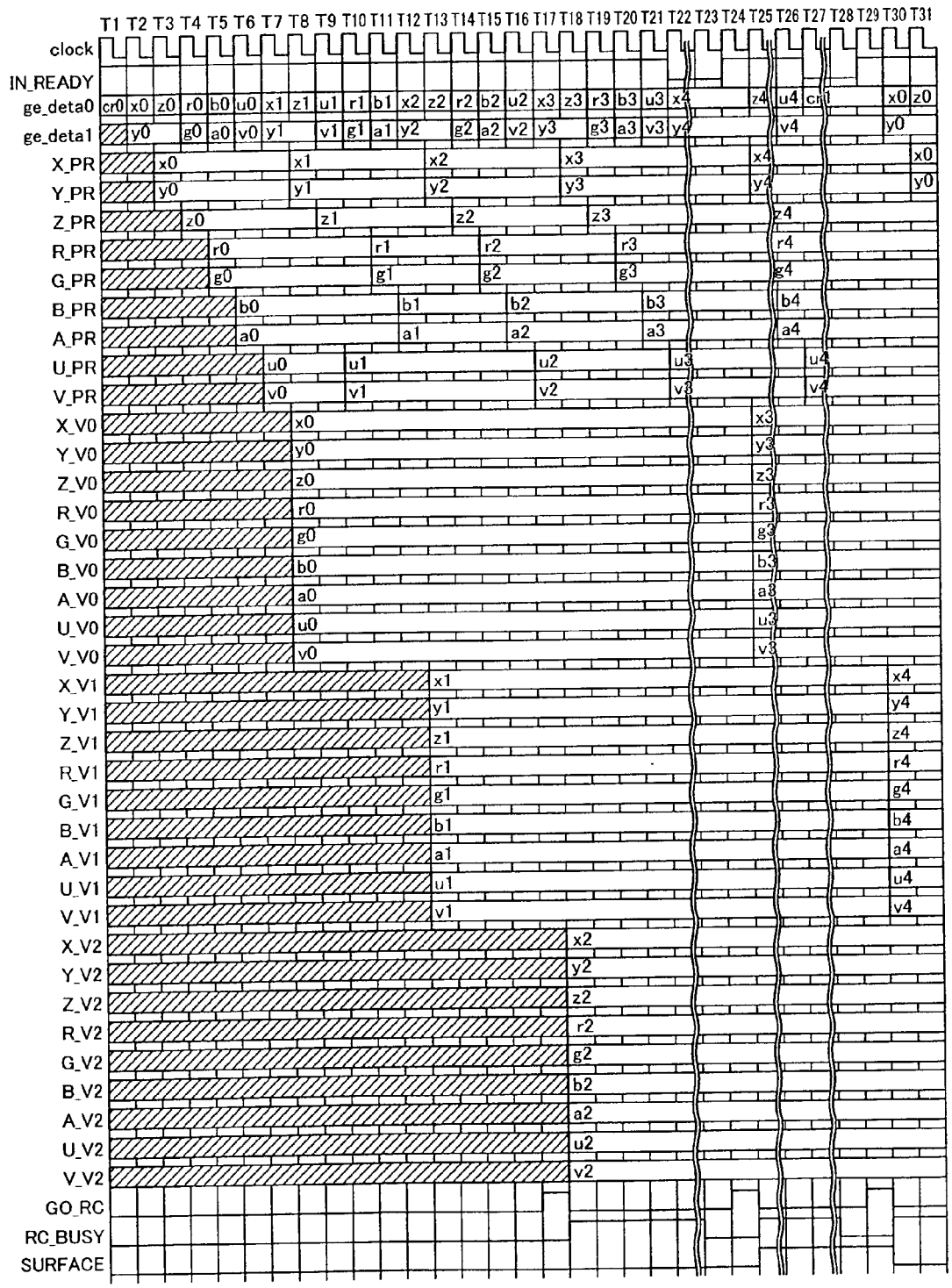
FIG. 5 is a timing chart for rendering process section 3 in a case of performing a rendering process to triangle strips shown in FIG. 4A.

FIG. 5 is a timing chart for rendering process section 3 when rendering process section 3 performs the rendering process to the triangle strips shown in FIG. 4A. Rendering process section 3 performs the process synchronously with a clock signal. An IN_READY signal is a signal which is outputted from input control section 12 into geometry process section 2 and host CPU 1. When IN_READY signal is at high level (abbreviated as "H level" hereinafter), geometry process section 2 or host CPU 1 can write data to rendering process section 3.

A GO_RC signal is a signal with which input control section 12 instructs rendering main process section 11 to start processing a primitive. When GO_RC signal is at H level, rendering main process section 11 starts processing a primitive. An RC_BUSY signal is a signal which indicates whether or not rendering main process section 11 is executing the process to the primitive. When RC_BUSY signal is at H level, it indicates that rendering main process section 11 is executing the process to the primitive. A SURFACE signal is a signal which indicates the direction of each triangle to be rendered. When SURFACE signal is at low level (abbreviated as "L level" hereinafter), it indicates that the triangle is rendered counterclockwise. When SURFACE signal is at H level, it indicates that the triangle is rendered clockwise.

In the first cycle T1, since IN_READY signal is active (at H level), geometry process section 2 outputs control data (cr0) which represents the type of primitives to be rendered (control data cr0 represents that the primitive type is a triangle strip in this case) and the types of element data to be used (control data cr0 represents that all of coordinates, colors and texture coordinates are used in this case), to data bus ge_data0.

In a cycle T2, input control section 12 inputs the control data which is outputted to data bus ge_data0. In addition, geometry process section 2 outputs the X coordinate value (x0) and the Y coordinate value (y0) of a vertex 0 to data buses ge_data0 and ge_data1, respectively.

In a cycle T3, the X and Y coordinate values x0 and y0 which are outputted to data buses ge_data0 and ge_data1, respectively, are written to pending register X_PR of X input section 13 and pending register Y_PR of Y input section 18, respectively. In addition, geometry process section 2 outputs the Z coordinate value (z0) of vertex 0 to data bus ge_data0.

In a cycle T4, Z coordinate value z0 which is outputted to data bus ge_data0 is written to pending register Z_PR of Z input section 14. In addition, geometry process section 2 outputs R data (r0) and G data (g0) on vertex 0 to data buses ge_data0 and ge_data1, respectively.

In a cycle T5, R data r0 and G data g0 which are outputted to data buses ge_data0 and ge_data1, respectively, are written to pending register R_PR of R input section 15 and pending register G_PR of G input section 19, respectively. In addition, geometry process section 2 outputs B data (b0) and A data (a0) on vertex 0 to data buses ge_data0 and ge_data1, respectively.

In a cycle T6, B data b0 and A data a0 which are outputted to data buses ge_data0 and ge_data1, respectively, are written to pending register B_PR of B input section 16 and pending register A_PR of A input section 20, respectively. In addition, geometry process section 2 outputs the U coordinate value (u0) and V coordinate value (v0) of vertex 0 to data buses ge_data0 and ge_data1, respectively.

In a cycle T7, U coordinate value u0 and V coordinate value v0 which are outputted to data buses ge_data0 and ge_data1, respectively, are written to pending register U_PR of U input section 17 and pending register V_PR of V input section 21, respectively. In addition, geometry process section 2 outputs the X coordinate value (x1) and Y coordinate value (y1) of a vertex 1 to data buses ge_data0 and ge_data1, respectively.

In a cycle T8, since all the to-be-used element data of vertex 0 designated by control data cr0 have been inputted into element data input sections 13 to 21, respectively, the element data of vertex 0 held in pending registers X_PR, Y_PR, Z_PR, R_PR, G_PR, B_PR, A_PR, U_PR and V_PR are transferred to vertex registers X_V0, Y_V0, Z_V0, R_V0, G_V0, B_V0, A_V0, U_V0 and V_V0, respectively. At the same time, the X coordinate value x1 and the Y coordinate value y2 of vertex 1 which have been outputted to data buses ge_data0 and ge_data1 are written to pending register X_PR of X input section 13 and pending register Y_PR of Y input section 18, respectively. In addition, geometry process section 2 outputs the Z coordinate value (z1) of vertex 1 to data bus ge_data0.

Thereafter, the same process is repeated. Namely, in a cycle T13, the element data of vertex 1 held in pending registers X_PR, Y_PR, Z_PR, R_PR, G_PR, B_PR, A_PR, U_PR and V_PR are transferred to vertex registers X_V1, Y_V1, Z_V1, R_V1, G_V1, B_V1, A_V1, $U\_{V1}$ and $V\_V1$, respectively. In a cycle T18, the element data of vertex 2 held in pending registers X_PR, Y_PR, Z_PR, R_PR, G_PR, B_PR, A_PR, U_PR and V_PR are transferred to vertex registers X_V2, Y_V2, Z_V2, R_V2, G_V2, B_V2, A_V2, U_V2 and V_V2, respectively.

It is noted that the order of the element data inputted from geometry process section 2 into respective element data input sections 13 to 21 may be optionally set. As shown in T8 to T12, for example, the element data may be inputted into respective element data input sections 13 to 21 in the order of XYZ coordinate values, texture coordinate values and color data. Further, input control section 12 manages the types of the element data inputted from geometry process section 2. If all the types of to-be-used data instructed by control data cr0 are inputted into element data input sections 13 to 21, input control section 12 controls the element data to be transferred from the pending registers to the vertex registers, respectively.

As for to which of the three vertex registers, the element data is transferred from each pending register, the vertex data held in the pending register is set to be always transferred to vertex register 0 right after control data cr0 is transferred and the other vertex data is controlled to be transferred to which vertex register depending on the designated primitive type. In case of the triangle strips shown in FIG. 4A, the vertex data is transferred to the vertex registers in the order of the vertex registers 0, 1, 2, 0, 1 and 2.

In a cycle T17 right before respective element data of vertex 2 are transferred to respective vertex registers, input control section 12 sets GO_RC signal to be active (at H level) and instructs rendering main process section 11 to start processing the primitive. At this moment, input control section 12 sets SURFACE signal at L level to thereby controls triangle 0-1-2 to be rendered counterclockwise.

In a cycle T18, rendering main process section 11 starts processing the primitive, sets RC_BUSY signal at H level, and thereby notifies input control section 12 that rendering main process section 11 is executing the process to the primitive so as not to update vertex registers 0 to 2.

Even if rendering main process section 11 is processing triangle 0-1-2, IN_READY signal is kept at H level as shown in T18 to T21 and geometry process section 2 continues to write the respective element data of vertex 3 to the pending registers. If all the element data of vertex 3 have been written to the pending registers, the vertex data cannot be transferred from the pending registers to the vertex registers. Due to this, IN_READY signal is set at L level to suspend writing the next vertex data.

In a cycle T23, when rendering main process section 11 finishes processing triangle 0-1-2 and is ready to process the next primitive (triangle 1-2-3), rendering main process section 11 sets RC_BUSY signal at L level.

In a cycle T24, input control section 12 sets IN_READY signal at H level, and notifies geometry process section 2 that respective element data of vertex 4 can be written to the pending registers. At the same time, input control section 12 sets GO_RC signal to be active (at H level), and thereby instructs rendering main process section 11 to start processing the next primitive (triangle 1-2-3).

In a cycle T25, input control section 12 transfers the respective element data of vertex 3 held in the pending registers to vertex registers 0. At this moment, input control section 12 toggles SURFACE signal to H level and notifies rendering main process section 11 that the rendering order of triangle 1-2-3 is clockwise. Rendering main process section 11 starts processing the primitive, sets RC_BUSY signal at H level, and thereby notifies input control section 12 that rendering main process section 11 is executing the process to the primitive so as not to update vertex registers 0 to 2.

In a cycle T25 and the following, respective element data of vertex 4 are sequentially written to the pending registers. Even if all the element data of vertex 4 are written to the pending registers, input control section 12 sets IN_READY signal at L level so as not to change the contents of the pending registers and the control data as long as rendering main process section 11 is executing the process to triangle 1-2-3, i.e., RC_BUSY signal is at H level.

When RC_BUSY signal becomes L level (in a cycle T28), input control section 12 sets IN_READY signal at H level to thereby notify geometry process section 2 that respective element data of the next vertex can be written to the pending registers, and sets GO_RC signal to be active (at H level) to thereby instruct rendering main process section 11 to start processing the next primitive (triangle 2-3-4) in a cycle T29.

In this way, triangles 0-1-2 (counterclockwise), 1-2-3 (clockwise) and 2-3-4 (counterclockwise) shown in FIG. 4A are sequentially rendered.

FIG. 4B shows the rendering process performed to line strips, i.e., shows that three lines 0-1, 1-2 and 2-3 are sequentially rendered. In this line strip rendering process, host CPU 1 writes vertex data to rendering process section 3.

Figure 6:
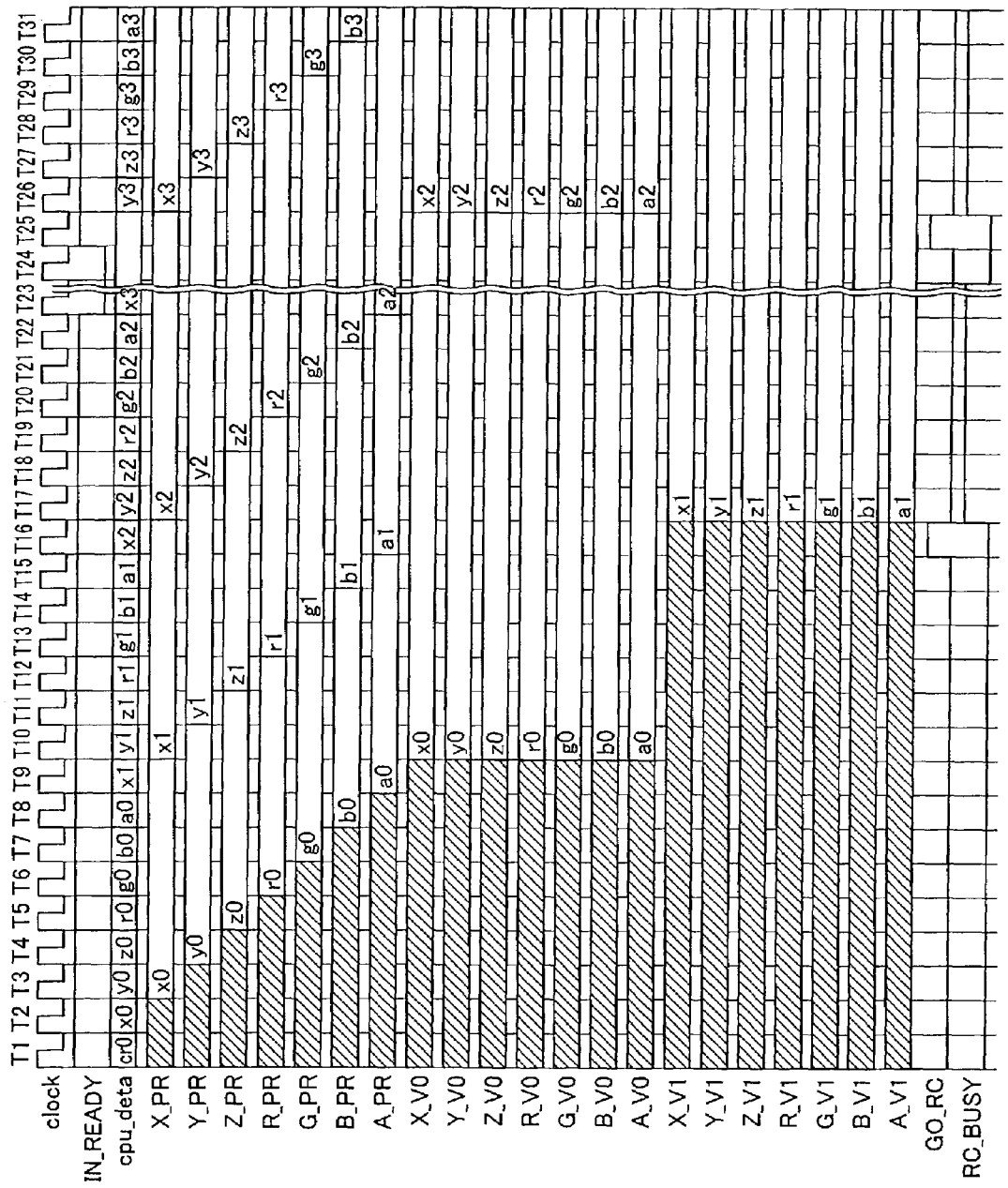
FIG. 6 is a timing chart for rendering process section 3 in a case of performing a rendering process to line strips shown in FIG. 4B.

FIG. 6 is a timing chart for rendering process section 3 when rendering process section 3 performs the rendering process to the line strips shown in FIG. 4B. In first cycle T1, since IN_READY signal is active (at H level), host CPU 1 outputs control data (cr0) which represents the types of primitives to be rendered (control data (cr0) represents line strips in this case) and the types of element data to be used (control data (cr0) represents that only the coordinates and colors are used and that texture coordinates are not used in this case), to data bus cpu_data.

In cycle T2, input control section 12 inputs the control data outputted to data bus cpu_data. In addition, host CPU 1 outputs the X coordinate value (x0) of vertex 0 to data bus cpu_data.

In cycle T3, X coordinate value x0 which is outputted to data bus cpu_data is written to pending register X_PR of X input section 13. In addition, host CPU 1 outputs the Y coordinate value (y0) of vertex 0 to data bus cpu_data.

In cycle T4, Y coordinate value y0 which is outputted to data bus cpu_data is written to pending register Y_PR of Y input section 18. In addition, host CPU 1 outputs the Z coordinate value (z0) of vertex 0 to data bus cpu_data.

In cycle T5, Z coordinate value z0 which is outputted to data bus cpu_data is written to pending register Z_PR of Z input section 14. In addition, host CPU 1 outputs R data (r0) on vertex 0 to data bus cpu_data.

In cycle T6, R data r0 which is outputted to data bus cpu_data is written to pending register R_PR of R input section 15. In addition, host CPU 1 outputs G data (g0) on vertex 0 to data bus cpu_data.

In cycle T7, G data g0 which is outputted to data bus cpu_data is written to pending register G_PR of G input section 19. In addition, host CPU 1 outputs B data (b0) on vertex 0 to data bus cpu_data.

In cycle T8, B data b0 which is outputted to data bus cpu_data is written to pending register B_PR of B input section 16. In addition, host CPU 11 outputs A data (a0) on vertex 0 to data bus cpu_data.

In cycle T9, A data a0 which is outputted to data bus cpu_data is written to pending register A_PR of A input section 20. In addition, host CPU 1 outputs the X coordinate value (x1) of vertex 1 to data bus cpu_data.

In cycle T10, since all the element data of vertex 0 designated by control data cr0 have been inputted into element data input sections 13 to 16 and 18 to 20, all the element data of vertex 0 held in pending registers X_PR, Y_PR, Z_PR, R_PR, G_PR, B_PR and A_PR are transferred to vertex registers X_V0, Y_V0, Z_V0, R_V0, G_V0, B_V0 and A_V0, respectively. At the same time, X coordinate value x1 which has been outputted to data bus cpu_data is written to pending register X_PR of X input section 13. In addition, host CPU 1 outputs the Y coordinate value (y1) of vertex 1 to data bus cpu_data.

Thereafter, the same process is repeated. Namely, in cycle T17, the element data held in pending registers X_PR, Y_PR, Z_PR, R_PR, G_PR, B_PR, and A_PR are transferred to vertex registers X_V1, Y_V1, Z_V1, R_V1, G_V1, B_V1 and A_V1, respectively.

It is noted that the order of the element data input into respective element data input sections 13 to 16 and 18 to 20 from host CPU 1 may be optionally set. In addition, input control section 12 manages the types of the element data inputted from host CPU 1 and if all types of to-be-used data designated by control data cr0 have been inputted into element data input sections 13 to 16 and 18 to 20, input control section 12 controls the element data to be transferred from the pending registers to the vertex registers, respectively.

In case of the line strips shown in FIG. 4B, the vertex data is transferred to the vertex registers in the order of vertex registers 0, 1, 0 and 1.

In cycle T16 right before the respective element data of vertex 1 is transferred to the vertex registers, input control section 12 sets GO_RC signal to be active (at H level) and instructs rendering main process section 11 to start processing the primitive.

In cycle T17, rendering main process section 11 starts processing the primitive, sets RC_BUSY signal at H level, and thereby notifies input control section 12 that rendering main process section 11 is executing the process to the primitive so as not to update vertex registers 0 and 1.

Even if rendering main process section 11 is processing line 0-1, IN_READY signal is kept at H level as shown in T17 to T22 and host CPU 1 continues to write the respective element data of vertex 2 to the pending registers. If all the element data of vertex 2 have been written to the pending registers, the vertex data cannot be transferred from the pending registers to the vertex registers. Due to this, IN_READY signal is set at L level to suspend writing the next vertex data.

In cycle T24, when rendering main process section 11 finishes processing line 0-1 and is ready to process the next primitive (line 1-2), then rendering main process section 11 sets RC_BUSY signal at L level.

In cycle T25, input control section 12 sets IN_READY signal at H level to thereby notify host CPU 1 that the respective element data of vertex 3 can be written to the pending registers, and sets GO_RC signal to be active (at H level) to thereby instruct rendering main process section 11 to start processing the next primitive (line 1-2).

In a cycle T26, input control section 12 transfers the respective element data of vertex 2 held in the pending registers to vertex registers 0. Rendering main process section 11 starts processing the primitive and sets RC_BUSY signal at H level to thereby notify input control section 12 that rendering main process section 11 is executing the process to the primitive so as not to update vertex registers 0 and 1.

In a cycle T26 and the following, respective element data of vertex 3 are sequentially written to the pending registers. Even if all the element data of vertex 3 are written to the pending registers, input control section 12 sets IN_READY signal at L level so as not to change the contents of the pending registers and the control data as long as rendering main process section 11 is executing the process to line 1-2, i.e., RC_BUSY signal is at H level.

In this way, lines 0-1, 1-2 and 2-3 shown in FIG. 4B are sequentially rendered.

FIG. 4C shows the rendering process performed to triangle fans, i.e., shows that three triangles 0-1-2 (counterclockwise), 0-2-3 (clockwise) and 0-3-4 (counterclockwise) are sequentially rendered.

Figure 7:
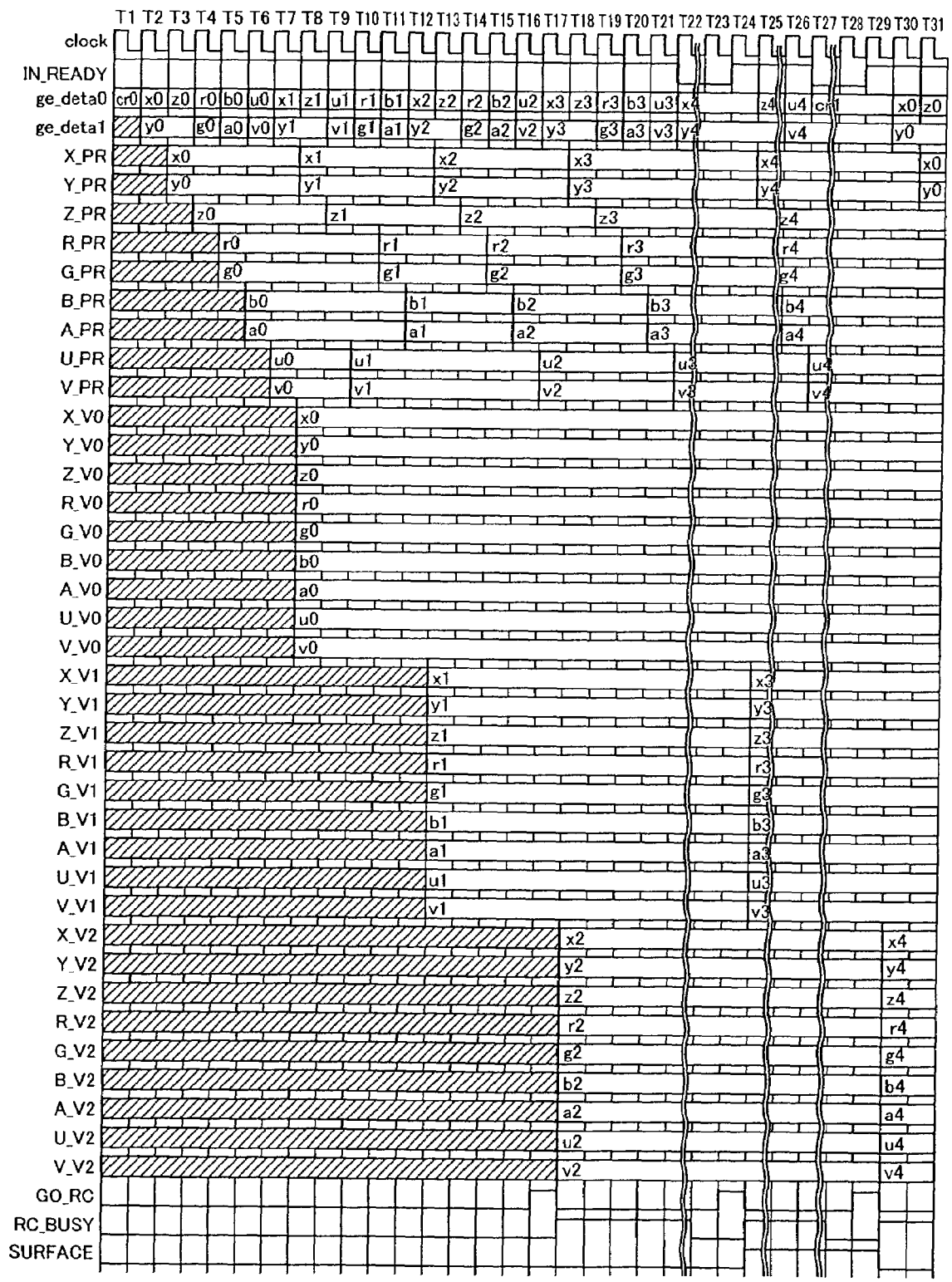
FIG. 7 is a timing chart for rendering process section 3 in a case of performing a rendering process to triangle fans shown in FIG. 4C.

FIG. 7 is a timing chart for rendering process section 3 when rendering process section 3 performs a rendering process to the triangle fans shown in FIG. 4C. The processes T2 to T24 are the same as those T2 to T24 shown in FIG. 5 in the rendering process performed to the triangle strips, they will not be repeated here. In the detailed description the rendering process for the triangle fans, the primitives are such that triangles are sequentially rendered by vertex 0 set as a base point and vertexes which are inputted following vertex 0. Due to this, after the respective element data of vertex 0 have been transferred from the pending registers to vertex registers 0, the vertex data 0 is not updated. In case of the triangle fans, therefore, the vertex data is transferred to the vertex registers in the order of vertex registers 0, 1, 2, 1 and 2.

In first cycle T1, since IN_READY signal is active (at H level), geometry process section 2 outputs control data (cr0) representing the types of primitives to be rendered (control data (cr0) represents triangle fans in this case) and types of element data to be used (control data (cr0) represents that coordinates, colors and texture coordinates are all used in this case), to data bus ge_data0.

In cycle T25, input control section 12 transfers respective element data of vertex 3 held in the pending registers to vertex registers 1. At this moment, input control section 12 toggles SURFACE signal to H level and notifies rendering main process section 11 that the rendering order of the vertexes of triangle 0-2-3 is clockwise. Rendering main process section 11 starts processing the primitive, sets RC_BUSY signal at H level, and thereby notifies input control section 12 that rendering main process section 11 is executing the process to the primitive so as not to update vertex registers 0 to 2.

In cycle T25 and the following, respective element data of vertex 4 are sequentially written to the pending registers. Even if all the element data of vertex 4 are written to the pending registers, input control section 12 sets IN_READY signal at L level so as not to change the contents of the pending registers and the control data as long as rendering main process section 11 is executing the process to triangle 0-2-3, i.e., RC_BUSY signal is at H level.

When RC_BUSY signal becomes L level (in cycle T28), input control section 12 sets IN_READY signal at H level to thereby notify geometry process section 2 that respective element data of the next vertex can be written to the pending registers and sets GO_RC signal to be active (at H level) to thereby instruct rendering main process section 11 to start processing the next primitive (triangle 0-3-4) in cycle T29.

In this way, triangles 0-1-2 (counterclockwise), 0-2-3 (clockwise) and 0-3-4 (counterclockwise) shown in FIG. 4C are sequentially rendered.

FIG. 4D shows the rendering process performed to points, i.e., shows that four points 0, 1, 2 and 3 are sequentially rendered. In this point rendering process, host CPU 1 writes vertex data to rendering process section 3.

Figure 8:
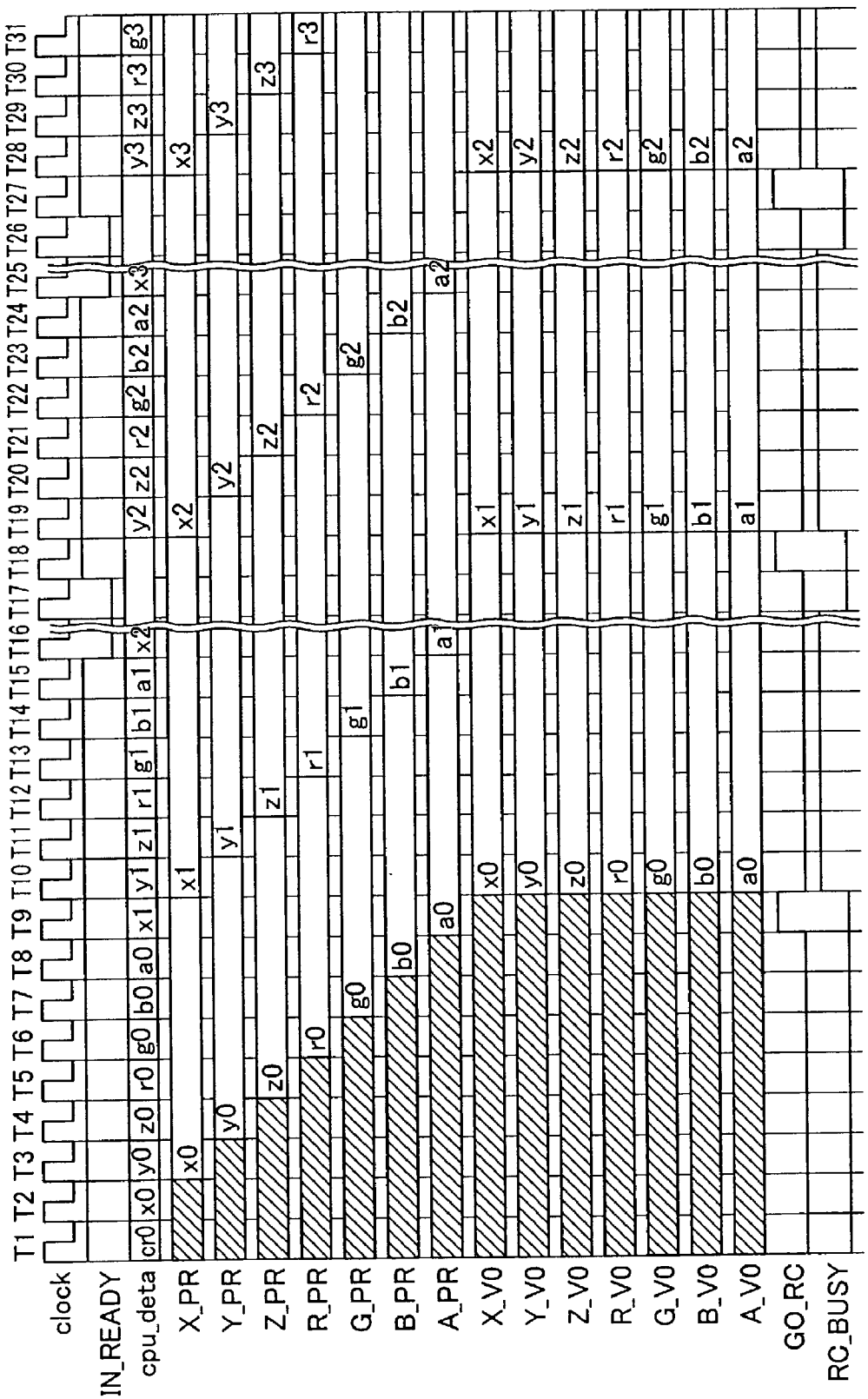
FIG. 8 is a timing chart for rendering process section 3 in a case of performing a rendering process to points shown in FIG. 4D.

FIG. 8 is a timing chart for rendering process section 3 when rendering process section 3 performs the rendering process to the points shown in FIG. 4D. Since the processes in T2 to T8 are the same as those in T2 to T8 in the line strip rendering process shown in FIG. 6, the detailed description will not be repeated here. In the point rendering process, whenever respective element data of respective vertexes are transferred from the pending registers to vertex registers 0, input control section 12 instructs rendering main process section 11 to start rendering.

In first cycle T1, since IN_READY signal is active (at H level), host CPU 1 outputs control data (cr0) which represents the types of primitives to be rendered (control data (cr0) represents points in this case) and the types of element data to be used (control data (cr0) represents that only coordinates and colors are used and that texture coordinates are not used in this case), to data bus cpu_data.

In cycle T9, A data a0 which is outputted to data bus cpu_data is written to pending register A_PR of A input section 20. In addition, host CPU 1 outputs the X coordinate value (x1) of vertex 1 to data bus cpu_data. At this moment, input control section 12 sets GO_RC signal to be active (at H level) and thereby instructs rendering main process section 11 to start processing the primitive.

In a cycle T10, since all the to-be-used element data of vertex 0 designated by control data cr0 have been inputted into element data input sections 13 to 16 and 18 to 20, the element data of vertex 0 held in pending registers X_PR, Y_PR, Z_PR, R_PR, G_PR, B_PR and A_PR are transferred to X_V0, Y_V0, Z_V0, R_V0, G_V0, B_V0 and A_V0, respectively and rendering main process section 11 starts rendering point 0. At the same time, X coordinate value x1 which has been outputted to data bus cpu_data is written to pending register X_PR of X input section 13. Further, host CPU 1 outputs the Y coordinate value (y1) of vertex 1 to data bus cpu_data.

Thereafter, the same process is repeated. Namely, in cycle T19, the element data of vertex 1 held in pending registers X_PR, Y_PR, Z_PR, R_PR, G_PR, B_PR, and A_PR are transferred to vertex registers X_V0, Y_V0, Z_V0, R_V0, G_V0, B_V0 and A_V0, respectively and rendering main process section 11 starts rendering point 1.

In cycle T28, the element data of vertex 2 held in pending registers X_PR, Y_PR, Z_PR, R_PR, G_PR, B_PR, and A_PR are transferred to vertex registers X_V0, Y_V0, Z_V0, R_V0, G_V0, B_V0 and A_V0, respectively and rendering main process section 11 starts rendering point 2.

In this way, points 0, 1, 2 and 3 shown in FIG. 4D are sequentially rendered. It is noted that only vertex registers 0 are used in the point rendering process of rendering process section 3 in this embodiment.

In the computer graphics system, a clipping process for cutting off a rendering target object and rendering the cut-off objects is sometimes carried out by freely designating a rendering region. In this clipping process, a clipping surface which becomes the rendering region is designated and geometry process section 2 determines whether or not the coordinates of vertexes are within the rendering region. Geometry process section 2 newly generates intersections between the clipping surface and the primitives and writes data to rendering process section 3 so as to render new primitives.

FIG. 9A shows that triangle strips are clipped. In case of the triangle strips, when triangles 0-1-2 and 1-2-3 are rendered, triangle 0-1-2 is in a clip-in state in which triangle 0-1-2 is in the rendering region and triangle 0-1-2 is, therefore, kept to be rendered. On the other hand, since triangle 1-2-3 crosses the clipping surface, it is necessary to perform a clipping process to triangle 1-2-3. In this clipping process, vertex data of vertexes 4 and 5 which are intersections between the clipping surface and triangle 1-2-3 are generated. In addition, there is no need to render triangle 1-2-3 in the triangle strips, and triangles 1-2-4 and 1-4-5 are rendered using new triangle fans with vertex 1 set as a base point. FIGS. 9B to 9D will be described later.

Geometry process section 2 transfers data to rendering process section 3 according to the respective element groups such as coordinate values and color data (texture) in parallel to consecutive coordinate transformation and lighting processes when the data have been obtained to some extent. In addition, since an amount of operations required in the clipping process is large, coordinate values after the coordinate transformation are transferred to rendering process section 3 in parallel to the determination as to whether or not a triangle strip is in a clip-in state before obtaining the result of the clipping process. Since it is necessary to change primitives if clipping occurs, the vertex data is transferred again, thereby improving the processing efficiency of the overall graphics system.

Figure 10:
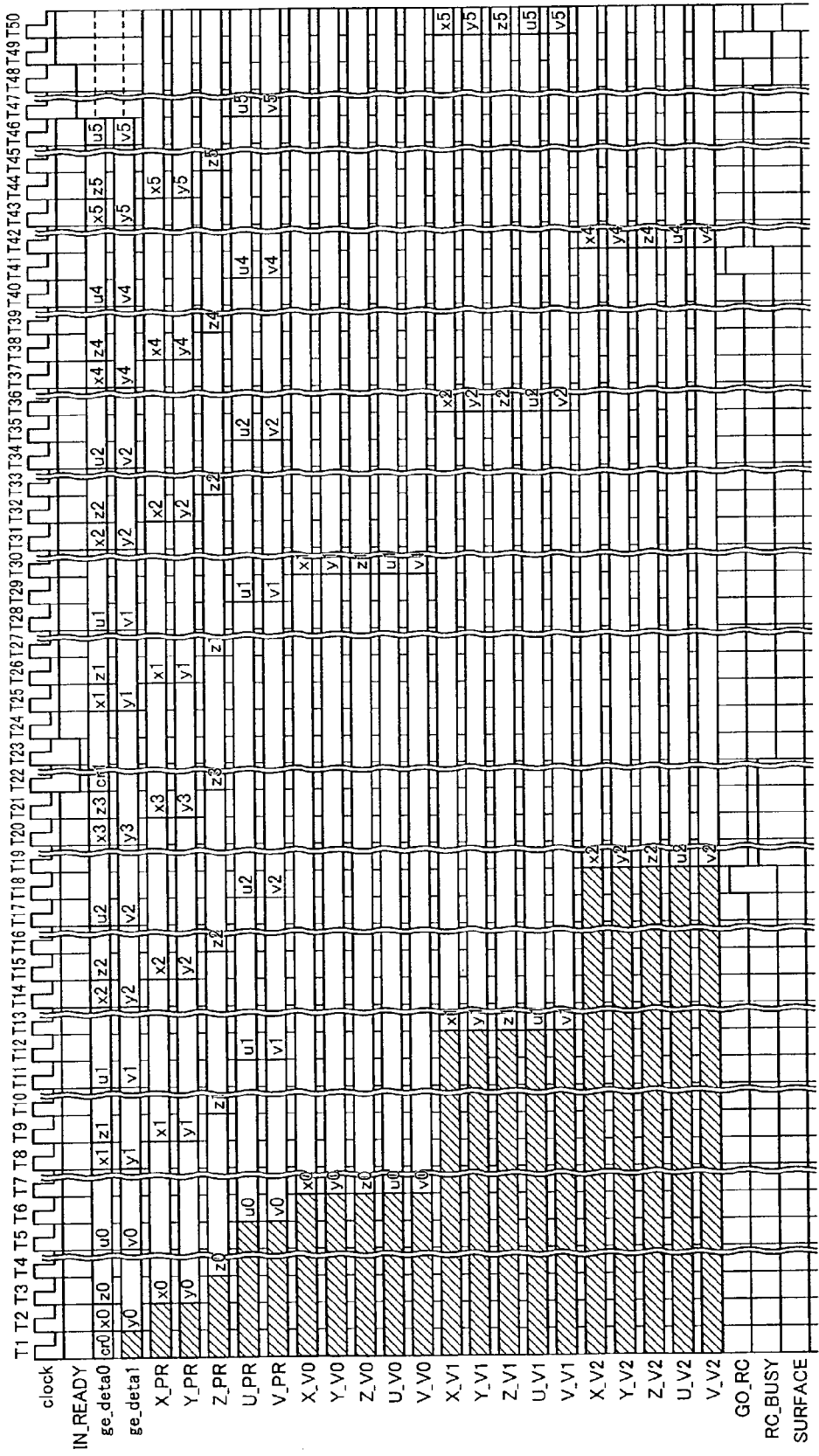
FIG. 10 is a timing chart for rendering process section 3 when the triangle strips shown in FIG. 9A are clipped.

FIG. 10 is a timing chart for rendering process section 3 when the triangle strips shown in FIG. 9A are clipped. In this timing chart, element data is divided into coordinate values and color data (texture) and the coordinate values are inputted into rendering process section 3 prior to the color data (texture). Geometry process section 2 uses the coordinate values until a lighting process is finished. The coordinate values and the color data (texture) are provided at intervals so that the color data (texture) is transferred to rendering process section 3 after the coordinate values. In the timing chart shown in FIG. 10, texture coordinate values are transferred after XYZ coordinate values are transferred and the transfer of the color data is not shown.

Since triangle 0-1-2 is to be rendered without being clipped, the same processes as those in T1 to T17 shown in FIG. 5 are carried out in T1 to T18 shown in FIG. 10 and respective element data of vertexes 0, 1 and 2 are written to the pending registers and the vertex registers. In cycle T19 and the following, rendering main process section 11 starts rendering triangle 0-1-2.

In cycles T21 and T22, rendering process section 3 receives the coordinate values x3, y3 and z3 of vertex 3 and coordinate values x3, y3 and z3 are written to the pending registers. On the other hand, if detecting that vertex 3 is in a clip-out state, geometry process section 2 outputs control data cr1 to data bus ge_data0 so as to render new triangle fans in cycle T22. In response to the next clock, control data cr1 is written to input control section 12.

Since a rendering process is performed to triangle 0-1-2, rendering process section 11 sets IN_READY signal at L level and outputs IN_READY signal to geometry process section 2 so as to suspend updating the control data. In cycle T24, when rendering main process section 11 completes processing triangle 0-1-2, rendering main process section 11 sets IN_READY signal at H level and accepts data write from geometry process section 2.

Since control data cr1 is inputted, input control section 12 ignores the coordinate values of vertex 3 written to the pending registers and waits for a new vertex data string to be inputted.

In cycles T25 to T42, vertex data of vertexes 1, 2 and 4 are written to vertex registers 0, 1 and 2, respectively. In cycle T42 and the following, a rendering process to triangle fan 1-2-4 is started. In cycles T43 to T50, vertex data of vertex 5 are written to vertex registers 1. In cycle T50 and the following, a rendering process to a triangle fan 1-4-5 is started.

In this way, triangle 0-1-2 is rendered, and then a rectangle 1-2-4-5 after triangle 1-2-3 is clipped is rendered.

FIG. 9B shows that points are clipped. In the clipping process to primitives which are points, it is unnecessary to change primitives even if clipping occurs. It, therefore, suffices to perform a process for determining whether or not vertexes are to be rendered.

Figure 11:
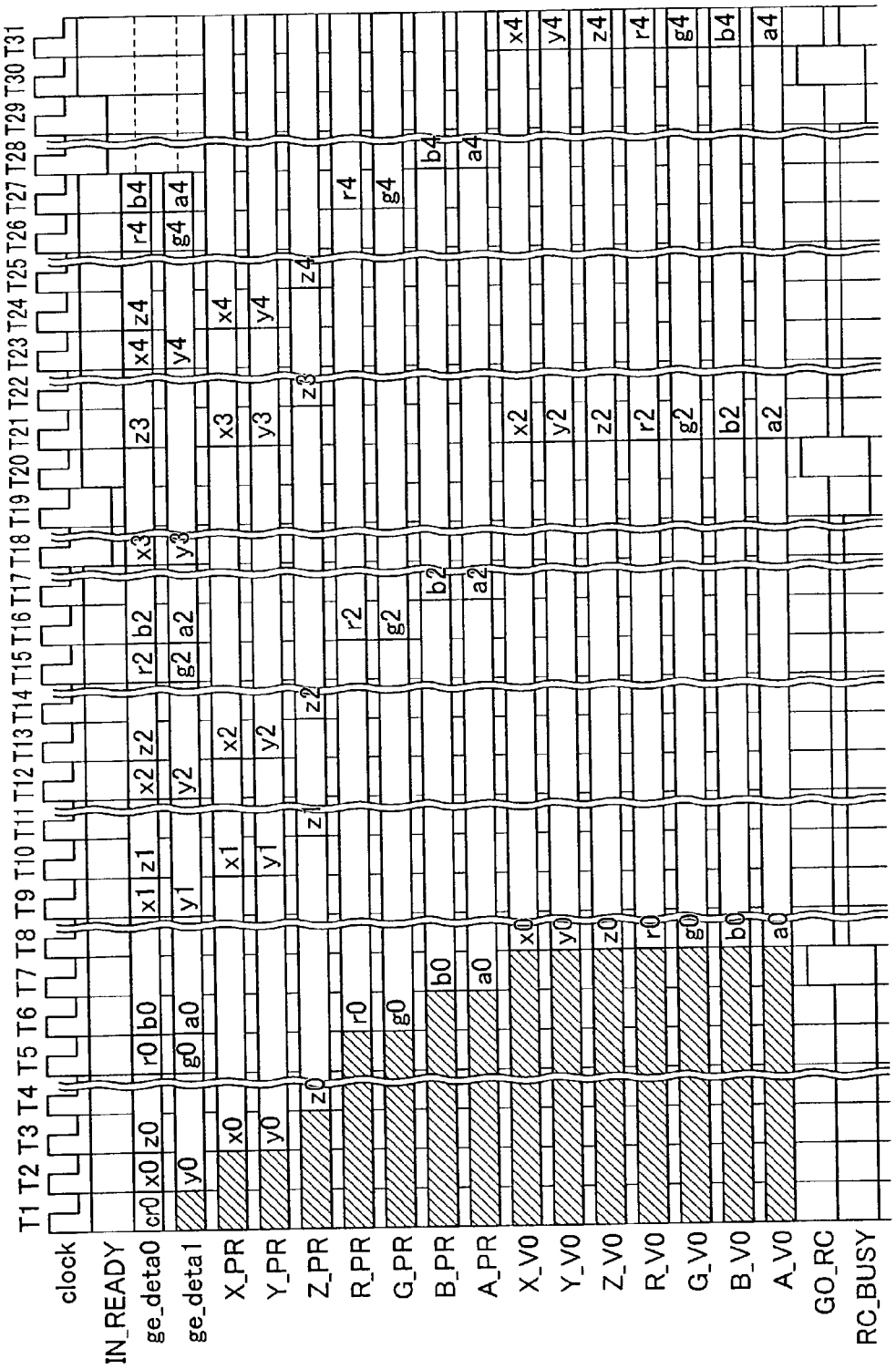
FIG. 11 is a timing chart for rendering process section 3 when the points shown in FIG. 9B are clipped.

FIG. 11 is a timing chart for rendering process section 3 when the points shown in FIG. 9B are clipped. Since vertex 0 is in a clip-in state, the same process as those in T1 to T10 shown in FIG. 8 are carried out and a rendering process to vertex 0 starts from cycle T8. It is noted that in the timing chart shown in FIG. 11, respective element data are received from two data buses ge_data0 and ge_data1 and written to the pending registers.

In cycles T9 to T11, before it is determined whether or not coordinate values x1, y1 and z1 of vertex 1 are in clip-in states, geometry process section 2 outputs these coordinate values and writes them to the pending registers. However, no color data is transferred since vertex 1 is in a clip-out state. In cycles T12 and T13, coordinate values x2, y2 and z2 of next vertex 2 are inputted.

Since the same element data as those already written to the pending registers are inputted before all the element data of vertex 1 are obtained, input control section 12 recognizes that new vertex data is inputted and ignores the element data of vertex 1 written to the pending registers. In cycles T13 and T14, coordinate values x2, y2 and z2 of new vertex 2 are written to the pending registers.

Since vertex 2 is in a clip-in state, color data r2, g2, b2 and a2 are outputted from geometry process section 2 and written to the pending registers in cycles 15–17. In cycle T18, all the element data of vertex 2 are obtained. However, since RC_BUSY signal is at H level, data write to vertex registers 0 is suspended until rendering main process section 11 completes processing vertex 0.

In cycle T19, when RC_BUSY signal becomes L level, input control section 12 sets GO_RC signal to be active (at H level) and instructs rendering main process section 11 to start processing vertex 2 (in cycle T20).

In cycle T21, the respective element data of vertex 2 written to the pending registers are transferred to the vertex registers. At the same time, rendering main process section 11 starts processing vertex 2, sets RC_BUSY signal at H level and thereby notifies input control section 12 that rendering main process section 11 is executing the process to the primitive so as not to update vertex registers 0.

Even if rendering main process section 11 is processing vertex 2, IN_READY signal is kept at H level as shown in T21 to T22. In addition, before it is determined whether or not coordinate values x3, y3 and z3 of vertex 3 are in clip-in states, geometry process section 2 outputs these coordinate values and writes the outputted coordinate values to the pending registers. However, since vertex 3 is in a clip-out state, no color data is transferred and, in cycles T23 and T24, coordinate values x4, y4 and z4 of next vertex 4 are inputted.

Since the same element data as those already written to the pending registers are inputted before all the element data of vertex 3 are obtained, input control section 12 recognizes that new vertex data is inputted and ignores the element data of vertex 3 written to the pending registers. In cycles T27 and T28, color data r4, g4, b4 and a4 are written to the pending registers. In a cycle T31, rendering main process section 11 starts rendering vertex 4.

In this way, points 0, 2 and 4 in clip-in states are rendered among points 0 to 4 shown in FIG. 9B.

As described so far, according to the rendering process apparatus in this embodiment, only if host CPU 1 and geometry process section 2 designate the types of to-be-rendered primitives such as points, lines or triangles and the types of to-be-used element data and write the vertex data to the rendering process apparatus, the vertex data is automatically transferred from the pending registers to the vertex registers and rendering main process section 11 automatically starts. Therefore, it is unnecessary for host CPU 1 and geometry process section 2 to manage the vertex numbers and start of rendering, thereby reducing processing load.

Furthermore, since the order of writing element data for one vertex data may be optionally set, the structure of the database and the process flow of geometry process section 2 are not restricted if host CPU 1 inputs vertex data into the rendering process apparatus, thereby making it possible to improve the processing performance of the overall graphics system.

Moreover, if the same element data is inputted into the rendering process apparatus or the control data is updated before all the designated data are obtained, the rendering process apparatus recognizes that a new vertex data string or a new primitive is inputted, thereby making it possible to accelerate the processing speed of the clipping process.

Second Embodiment

According to the rendering process apparatus in the first embodiment, vertex registers 0 and 1 are always used for line rendering and vertex registers 0 are always used for point rendering. According to a rendering process apparatus in the second embodiment, vertex registers 0 to 2 are used even for line rendering and vertex registers 0 to 2 are used for point rendering, as well.

FIG. 9C shows line strips rendered by the rendering process apparatus in the second embodiment according to the present invention. Four lines 0-1, 1-2, 2-3 and 3-4 are sequentially rendered.

Figure 12:
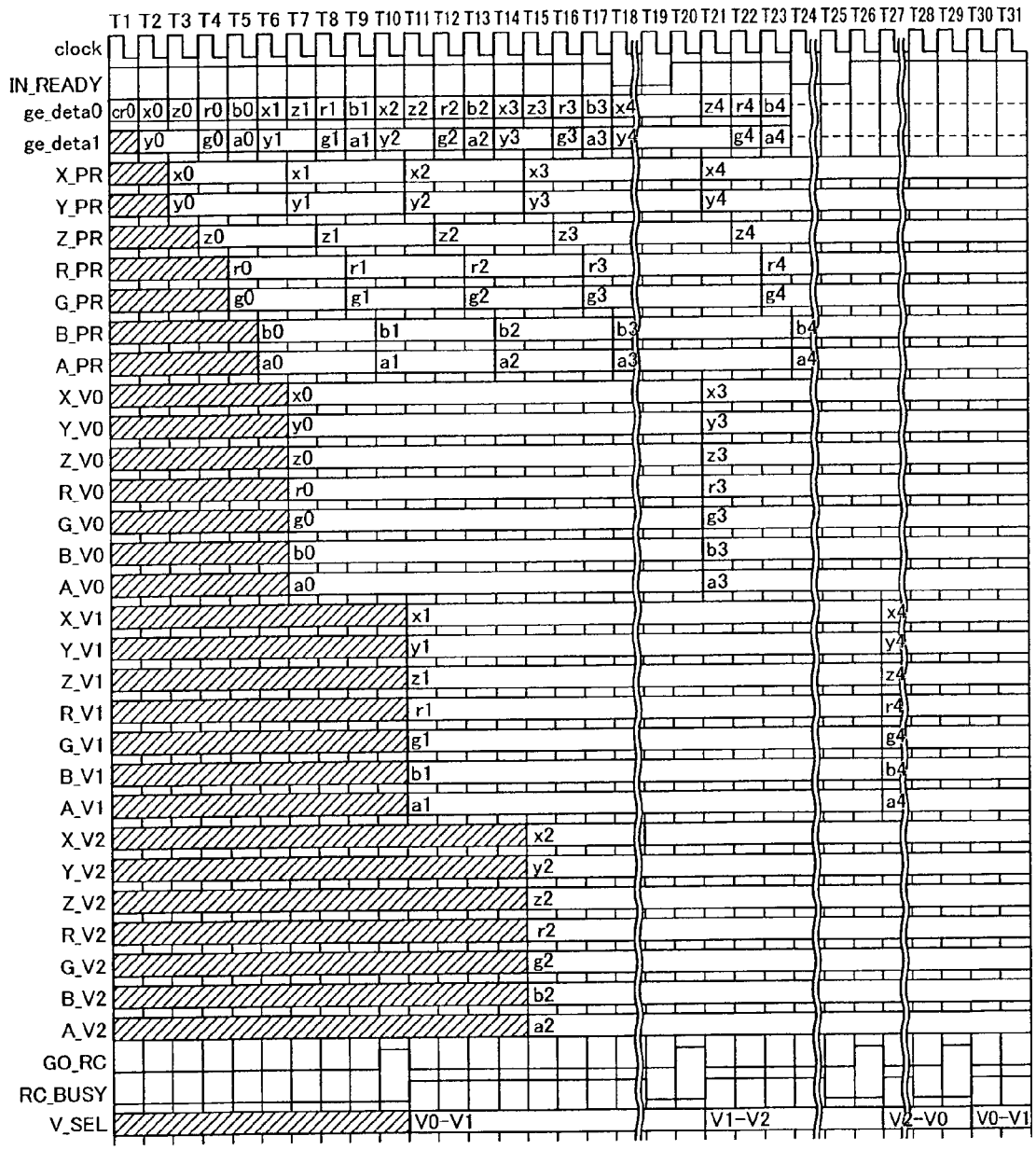
FIG. 12 is a timing chart for a rendering process apparatus in a second embodiment according to the present invention when the rendering process apparatus renders line strips.

FIG. 12 is a timing chart for rendering process apparatus when line strips are rendered. V_SEL signal is a signal which is outputted from input control section 12 to rendering main process section 11 and a code designating a combination of to-be-used vertex registers is outputted.

In first cycle T1, since IN_READY signal is active (at H level), geometry process section 2 outputs control data (cr0) representing the types of primitives to be rendered (control data (cr0) represents line strips in this case) and the types of element data to be used (control data (cr0) represents that only coordinates and colors are used and that texture coordinates are not used in this case), to data bus ge_data0.

In cycle T2, input control section 12 inputs control data outputted to data bus ge_data0. In addition, geometry process section 2 outputs X coordinate value (x0) and Y coordinate value (y0) of vertex 0 to data buses ge_data0 and ge_data1, respectively.

In cycle T3, X coordinate value x0 and Y coordinate value y0 outputted to data buses ge_data0 and ge_data1, respectively are written to pending register X_PR of X input section 13 and pending register Y_PR of Y input section 18, respectively. In addition, geometry process section 2 outputs Z coordinate value (z0) of vertex 0 to data bus ge_data0.

In cycle T4, Z coordinate value z0 outputted to data bus ge_data0 is written to pending register Z_PR of Z input section 14. In addition, R data (r0) and G data (g0) on vertex 0 are outputted to data buses ge_data0 and ge_data1, respectively.

In cycle T5, R data r0 and G data g0 outputted to data buses ge_data0 and ge_data1, respectively are written to pending register R_PR of R input section 15 and pending register G_PR of G input section 19, respectively. In addition, input control section 2 outputs B data (b0) and A data (a0) on vertex 0 to data buses ge_data0 and ge_data1, respectively.

In cycle T6, B data b0 and A data a0 outputted to data buses ge_data0 and ge_data1, respectively are written to pending register B_PR of B input section 16 and pending register A_PR of A input section 20, respectively. In addition, geometry process section 2 outputs X coordinate value (x1) and Y coordinate value (y1) of vertex 1 to data buses ge_data0 and ge_data1, respectively.

In cycle T7, since all the to-be-used element data of vertex 0 designated by control data cr0 have been inputted into element input sections 13 to 16 and 18 to 20, the element data of vertex 0 held in pending registers X_PR, Y_PR, Z_PR, R_PR, G_PR, B_PR and A_PR are transferred to vertex registers X_V0, Y_V0, Z_V0, R_V0, G_V0, B_V0 and A_V0, respectively. At the same time, X coordinate value x1 and Y coordinate value y1 of vertex 1 outputted to data buses ge_data0 and ge_data1 are written to pending register X_PR of X input section 13 and pending register Y_PR of Y input section 18, respectively. Geometry process section 2 outputs Z coordinate value z1 of vertex 1 to data bus ge_data0.

Thereafter, the same process is repeated. Namely, in cycle T11, element data of vertex 1 held in pending registers X_PR, Y_PR, Z_PR, R_PR. G_PR, B_PR and A_PR are transferred to vertex registers X_V1, Y_V1, Z_V1, R_V1, G_V1, B_V1 and A_V1, respectively.

In cycle T10 right before the respective element data of vertex 1 are transferred to vertex registers 1, input control section 12 sets GO_RC signal to be active (at H level) and thereby instructs rendering main process section 11 to start processing the primitive.

In cycle T11, since the respective element data of vertexes 0 and 1 have been transferred to vertex registers 0 and 1, input control section 12 outputs a code indicating that to-be-used vertex registers are vertex registers 0 and 1, to V_SEL signal. Rendering main process section 11 starts processing the primitive in accordance with the vertex data written to vertex registers 0 and 1, sets RC_BUSY signal at H level and thereby notifies input control section 12 that rendering main process section 11 is executing the process to the primitive so as not to update vertex registers 0 and 1.

Even if rendering main process section 11 is processing triangle 0-1-2, vertex registers 2 are not used. Due to this, as shown in cycles T10 to T14, IN_READY signal is kept at H level and geometry process section 2 continues to write respective element data of vertex 2 to the pending registers. In cycle T15, the element data of vertex 2 held in pending registers X_PR, Y_PR, Z_PR, R_PR, G_PR, B_PR and A_PR are transferred to vertex registers X_V2, Y_V2, Z_V2, R_V2, G_V2, B_V2 and A_V2, respectively.

As shown in cycles T14 to T17, IN_READY signal is kept at H level and geometry process section 2 continues to write respective element data of vertex 3 to the pending registers. If all the element data of vertex 3 have been written to the pending registers, the vertex data cannot be transferred from the pending registers to vertex registers 0. Due to this, IN_READY signal is set at L level to suspend writing the next vertex data.

In cycle T19, when rendering main process section 11 finishes processing line 0-1 and is ready to process the next primitive (line 1-2), rendering main process section 11 sets RC_BUSY signal at L level.

In cycle T20, input control section 12 sets IN_READY signal at H level to thereby notify geometry process section 2 that respective element data of vertex 4 can be written to the pending registers, and sets GO_RC signal to be active (at H level) to thereby instruct rendering main process section 11 to start processing the next primitive (line 1-2).

In cycle T21, input control section 12 transfers the respective element data of vertex 3 held in the pending registers to vertex registers 0. At this moment, since the respective element data of vertexes 1 and 2 have been transferred to vertex registers 1 and 2, input control section 12 outputs a code indicating that to-be-used vertex registers are vertex registers 1 and 2, to V_SEL signal. Rendering main process section 11 starts processing the primitive in accordance with the vertex data written to vertex registers 1 and 2, and sets RC_BUSY signal at H level to thereby notify input control section 12 that rendering main process section 11 is executing the process to the primitive so as not to update vertex registers 1 and 2.

Thereafter, as in the case of the above, the next primitive (line 2-3) is rendered in accordance with the respective vertex data of vertexes 2 and 3 transferred to vertex registers 2 and 0, and the next primitive (line 3-4) is rendered in accordance with the respective vertex data of vertexes 3 and 4 transferred to vertex registers 0 and 1.

In this way, lines 0-1, 1-2, 2-3 and 3-4 shown in FIG. 9C are sequentially rendered.

FIG. 9D shows points which are primitives rendered by the rendering process apparatus in the second embodiment according to the present invention. Five points 0, 1, 2, 3 and 4 are sequentially rendered.

Figure 13:
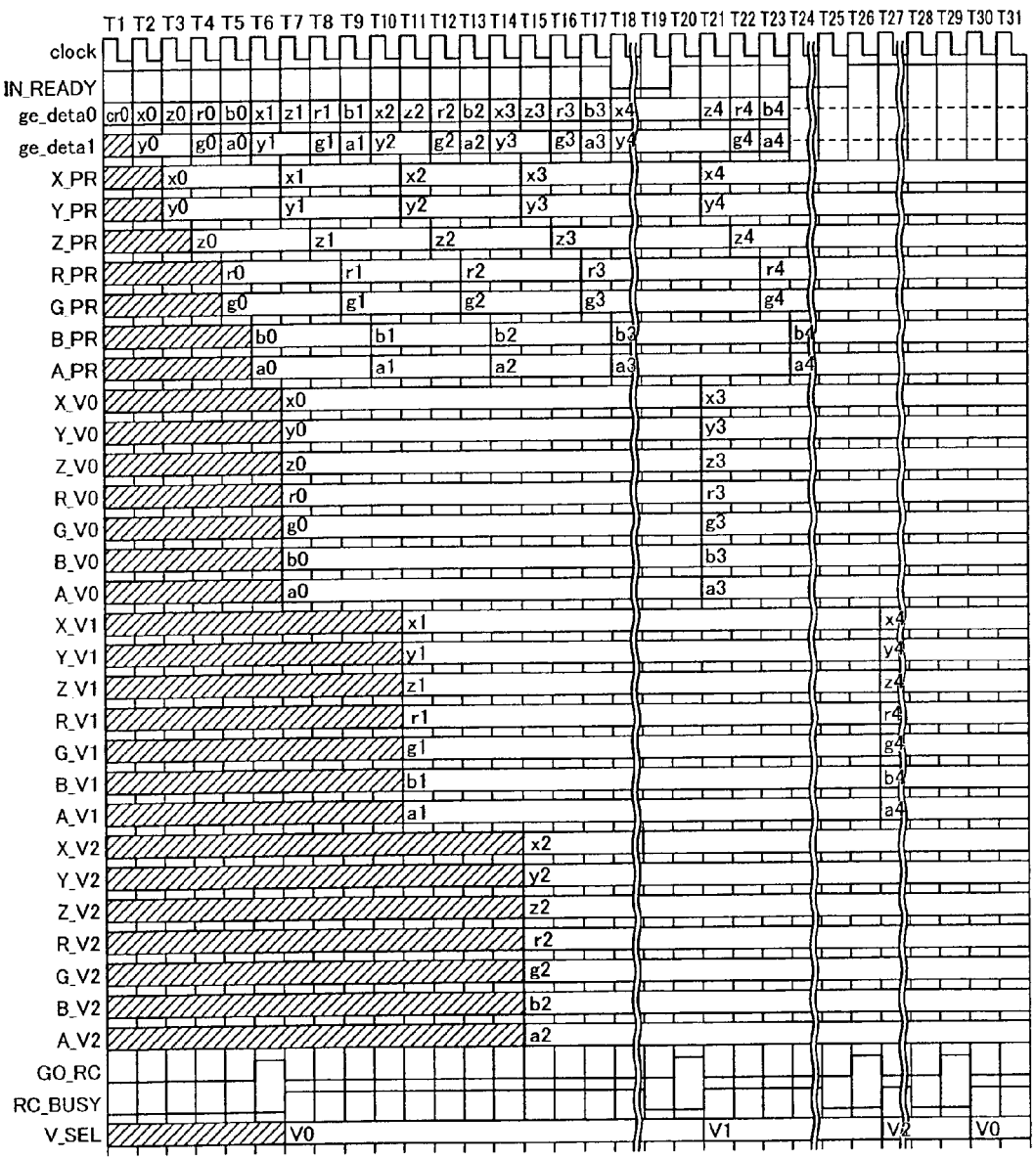
FIG. 13 is a timing chart for the rendering process apparatus in the second embodiment when the rendering process apparatus renders the points shown in FIG. 9D.

FIG. 13 is a timing chart for rendering process apparatus in the second embodiment according to the present invention when rendering process apparatus renders the points shown in FIG. 9D. V_SEL signal is a signal which is outputted from input control section 12 to rendering main process section 11 and a code designating to-be-used vertex registers is outputted.

In first cycle T1, since IN_READY signal is active (at H level), geometry process section 2 outputs control data (cr0) representing the types of primitives to be rendered (control data (cr0) represents points in this case) and the types of element data to be used (control data (cr0) represents that only coordinates and colors are used and that texture coordinates are not used in this case), to data bus ge_data0.

In cycle T2, input control section 12 inputs the control data outputted to data bus ge_data0. In addition, geometry process section 2 outputs X coordinate value (x0) and Y coordinate value y0 of vertex 0 to data buses ge_data0 and ge_data1, respectively.

In cycle T3, X coordinate value x0 and Y coordinate value y0 outputted to data buses ge_data0 and ge_data1, respectively are written to pending register X_PR of X input section 13 and pending register Y_PR of Y input section 18, respectively. In addition, geometry process section 2 outputs Z coordinate value (z0) of vertex 0 to data bus ge_data0.

In cycle T4, Z coordinate value z0 outputted to data bus ge_data0 is written to pending register Z_PR of Z input section 14. In addition, geometry process section 2 outputs R data (r0) and G data (g0) of vertex 0 to data buses ge_data0 and ge_data1, respectively.

In cycle T5, R data r0 and G data g0 outputted to data buses ge_data0 and ge_data1, respectively are written to pending register R_PR of R input section 15 and pending register G_PR of G input section 19, respectively. In addition, geometry process section 2 outputs B data (b0) and A data (a0) of vertex 0 to data buses ge_data0 and ge_data1, respectively.

In cycle T6, B data b0 and A data a0 outputted to data buses ge_data0 and ge_data1, respectively are written to pending register B_PR of B input section 16 and pending register A_PR of A input section 20, respectively. At this moment, input control section 12 sets GO_RC signal to be active (at H level) to thereby instruct rendering main process section 11 to start processing the primitive. In addition, geometry process section 2 outputs X coordinate value (x1) and Y coordinate value (y1) of vertex 1 to data buses ge_data0 and ge_data1, respectively.

In cycle T7, since the respective element data of vertex 0 have been transferred to vertex registers 0, input control section 12 outputs a code indicating that to-be-used vertex registers are vertex registers 0, to V_SEL signal. Rendering main process section 11 starts processing the primitive in accordance with the vertex data written to vertex registers 0, sets RC_BUSY signal at H level and thereby notifies input control section 12 that rendering main process section 11 is executing the process to the primitive so as not to update vertex registers 0.

Even if rendering main process section 11 is processing vertex 0, vertex registers 1 and 2 are not used. Due to this, as shown in cycles T7 to T15, IN_READY signal is kept at H level and geometry process section 2 continues to write respective data of vertexes 1 and 2 to the pending registers. In cycle T11, the element data of vertex 1 held in the pending registers are transferred to vertex registers 1, respectively. Further, in cycle T15, the element data of vertex 2 held in the pending registers are transferred to vertex registers 2, respectively.

As shown in cycles T15 to T17, IN_READY signal is kept at H level and geometry process section 2 continues to write respective element data of vertex 3 to the pending registers. It is noted that if all the element data of vertex 3 have been written to the pending registers, the vertex data cannot be transferred from the pending registers to vertex registers 0. Due to this, IN_READY signal is set at L level to suspend writing the next vertex data.

In cycle T19, when rendering main process section 11 finishes processing vertex 0 and is ready to process the next primitive (vertex 1), rendering main process section 11 sets RC_BUSY signal at L level.

In cycle T20, input control section 12 sets IN_READY signal at H level to thereby notify geometry process section 2 that respective element data of vertex 4 can be written to the pending registers, and sets GO_RC signal to be active (at H level) to thereby instruct rendering main process section 11 to start processing the next primitive (vertex 1).

In cycle T21, input control section 12 transfers the respective element data of vertex 3 held in the pending registers to vertex registers 0. At this moment, since the respective element data of vertex 1 have been transferred to vertex registers 1, a code indicating that to-be-used vertex registers are vertex registers 1 is outputted to V_SEL signal. Rendering main process section 11 starts processing the primitive in accordance with the vertex data written to vertex registers 1 and sets RC_BUSY signal at H level to thereby notify input control section 12 that rendering main process section 11 is executing the process to the primitive so as not to update vertex registers 1.

Thereafter, as in the case of the above, the next primitive (vertex 2) is rendered in accordance with the respective element data of vertex 2 transferred to vertex registers 2, the next primitive (vertex 3) is rendered in accordance with the respective element data of vertex 3 transferred to vertex registers 0 and the next primitive (vertex 4) is rendered in accordance with the respective element data of vertex 4 transferred to vertex registers 1.

In this way, the vertexes 0, 1, 2, 3 and 4 shown in FIG. 9D are sequentially rendered.

As described so far, according to the rendering process apparatus in this embodiment, since the vertex data in the pending registers are sequentially transferred to the vertex registers which rendering main process section 11 does not use, it is possible to improve data transfer efficiency for transferring data from host CPU 1 or geometry process section 2 to rendering process section 3.

Further, even if host CPU 1 and geometry process section 2 do not manage the vertex numbers, input control section 12 outputs V_SEL signal indicating the vertex registers to be used by rendering main process section 11, to rendering main process section 11. It is, therefore, possible to reduce processing load imposed on host CPU 1 and geometry process section 2 and to thereby accelerate the processing speed.

Third Embodiment

A rendering process apparatus in the third embodiment according to the present invention differs from the rendering process apparatus in the first embodiment shown in FIGS. 2 and 3 in the configurations of element data input sections 13 to 21. Therefore, the detailed description of overlapped configurations and functions will not be repeated here.

Figure 14:
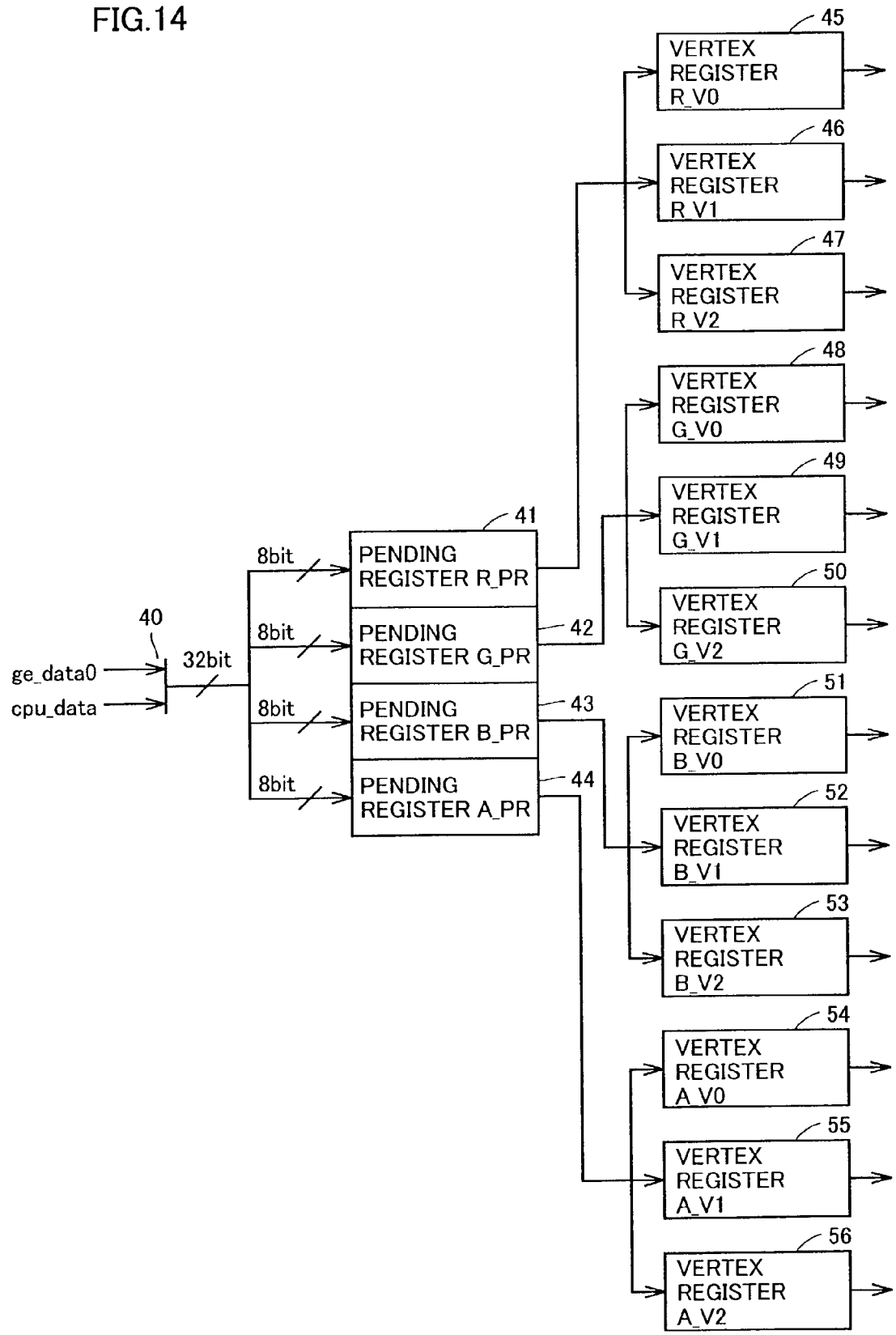
FIG. 14 is a block diagram showing a schematic configuration of an element data input section in a third embodiment according to the present invention.

FIG. 14 is a block diagram showing the schematic configuration of an element data input section in the third embodiment according to the present invention. This element data input section corresponds to color data R, G, B and A. If it is assumed that the word length of input data is 32 bits, the 32 bits are divided in the units of eight bits and allocated to four elements of color data, respectively. This element data input section is connected to data bus cpu_data connected to host CPU 1 and data bus ge_data0 connected to geometry process section 2.

The element data input section includes a selector 40 which selects one of data buses ge_data0 and cpu_data, pending registers R_PR 41, G_PR 42, B_PR 43 and A_PR 44 which temporarily hold data received from selector 40, vertex registers R_V0 to R_V2 (45 to 47) to which the data held in pending register R_PR 41 is transferred, vertex registers G_V0 to G_V2 (48 to 50) to which the data held in pending register G_PR 42 is transferred, vertex registers B_V0 to B_V2 (51 to 53) to which the data held in pending register B_PR 43 is transferred, and vertex registers A_V0 to A_V2 (54 to 56) to which the data held in pending register A_PR 44 is transferred.

According to this configuration, color data (four element data) to pending registers 41 to 44 are written by one data transfer. The transfer of vertex data from pending registers 41 to 44 to vertex registers 45 to 56 and the start of rendering main process section 11 are the same as those described in the first and second embodiments. While only the color data is mentioned herein, the input sections for XYZ coordinate values and texture coordinate values can be constituted in the same manner as that shown in FIG. 14.

As stated so far, according to the rendering process apparatus in the third embodiment according to the present invention, a part of element data which may be low in accuracy can be transferred at one time by packing a plurality of element data into one data word length, thereby making it possible to improve efficiency for transferring data to the rendering process apparatus.

Fourth Embodiment

A rendering process apparatus in the fourth embodiment according to the present invention differs from that in the first embodiment shown in FIGS. 2 and 3 in the configurations of element data input sections 13 to 21. Therefore, overlapped configurations and functions will not be repeatedly described herein in detail.

Figure 15:
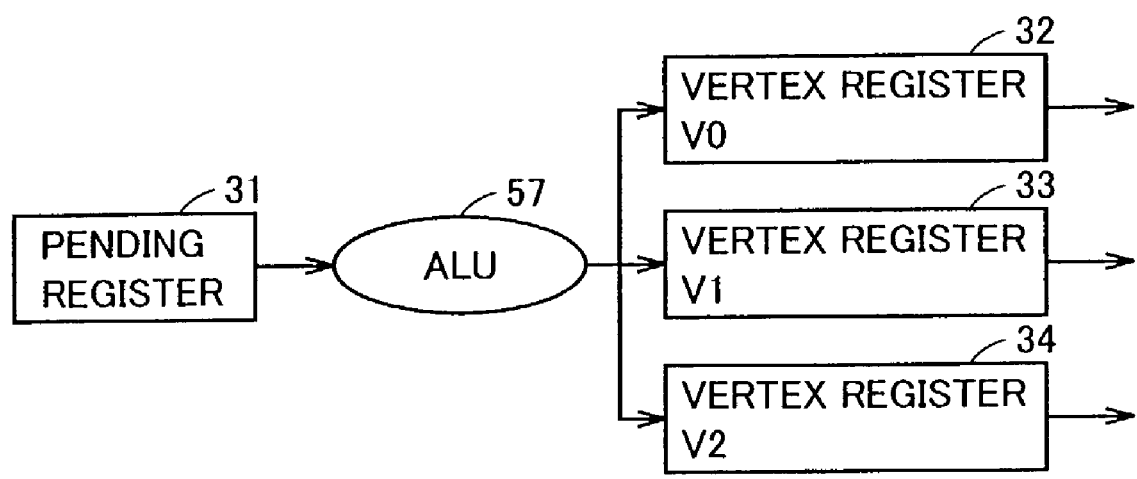
FIG. 15 is a block diagram showing a schematic configuration of an element data input section in a fourth embodiment according to the present invention.

FIG. 15 is a block diagram showing the schematic configuration of an element data input section in the fourth embodiment according to the present invention. This element data input section includes a pending register 31 which temporarily holds data outputted to data bus ge_data0 (ge_data1) or cpu_data, an ALU (Arithmetic and Logic Unit) 57 which executes an arithmetic operation to the data held in pending register 31, and vertex registers V0 to V2 (32 to 34) to which the data which has been subjected to the arithmetic operation by ALU 57 is transferred.

ALU 57 has a function of addition-subtraction, clamp, data format conversion or the like, performs an arithmetic operation during the transfer of the data from pending register 31 to vertex registers V0 to V2 (32 to 34). For example, ALU 57 can perform an addition-subtraction operation of an offset value on a coordinate value and two-dimensionally shift the display position of a rendering target on display section 4 if ALU 57 has the function of the addition-subtraction.

If ALU 57 has a clamp function, ALU 57 sets, for example, an upper limit value and a lower limit value in advance, transfers the value of pending register 31 to one of vertex registers 32 to 34 as it is if the value thereof is within a range between the upper and lower limit values, and transfers a boundary value to one of vertex registers 32 to 34 if the value of pending register 31 exceeds the range.

In a color data arithmetic operation in the lighting calculation of geometry process section 2, since color components out of a plurality of light sources are accumulated, an operation result sometimes goes beyond a designated data region. In this case, geometry process section 2 performs a process for replacing the operation result by a clamp value. By allowing this process to be performed within the element data input section, it is possible to perform this clamp process in parallel to data transfer.

Further, if ALU 57 has a data format conversion function and the data format of host CPU 1 or geometry process section 2 differs from that of rendering process section 3, it is possible to perform the conversion of a floating-point numeric value into a fixed-point numeric value, the conversion of a fixed-point numeric value into a floating-point numeric value, the change of the point position of a fixed-point numeric value and the like.

According to the conventional graphic system, the host CPU or the geometry process section converts the data format of data into that of the rendering process section. By giving ALU 57 a data formation conversion function, it is possible to perform data format conversion in parallel to data transfer.

As stated so far, according to the rendering process apparatus in this embodiment, by providing ALU 57 between pending register 31 and vertex registers 32 to 34, it is possible to allow the element data input section to perform the process which has been conventionally performed by host CPU 1, geometry process section 2 or rendering main process section 11, thereby making it possible to reduce processing load imposed on host CPU 1, geometry process section 2 or rendering main process section 11 and to thereby improve the processing speed of the overall graphics system.

Fifth Embodiment

A rendering process apparatus in the fifth embodiment according to the present invention differs from that in the first embodiment shown in FIGS. 2 and 3 in the configurations of X input section 13 and Y input section 18. Therefore, overlapped configurations and functions will not be repeatedly described herein in detail.

Figure 16:
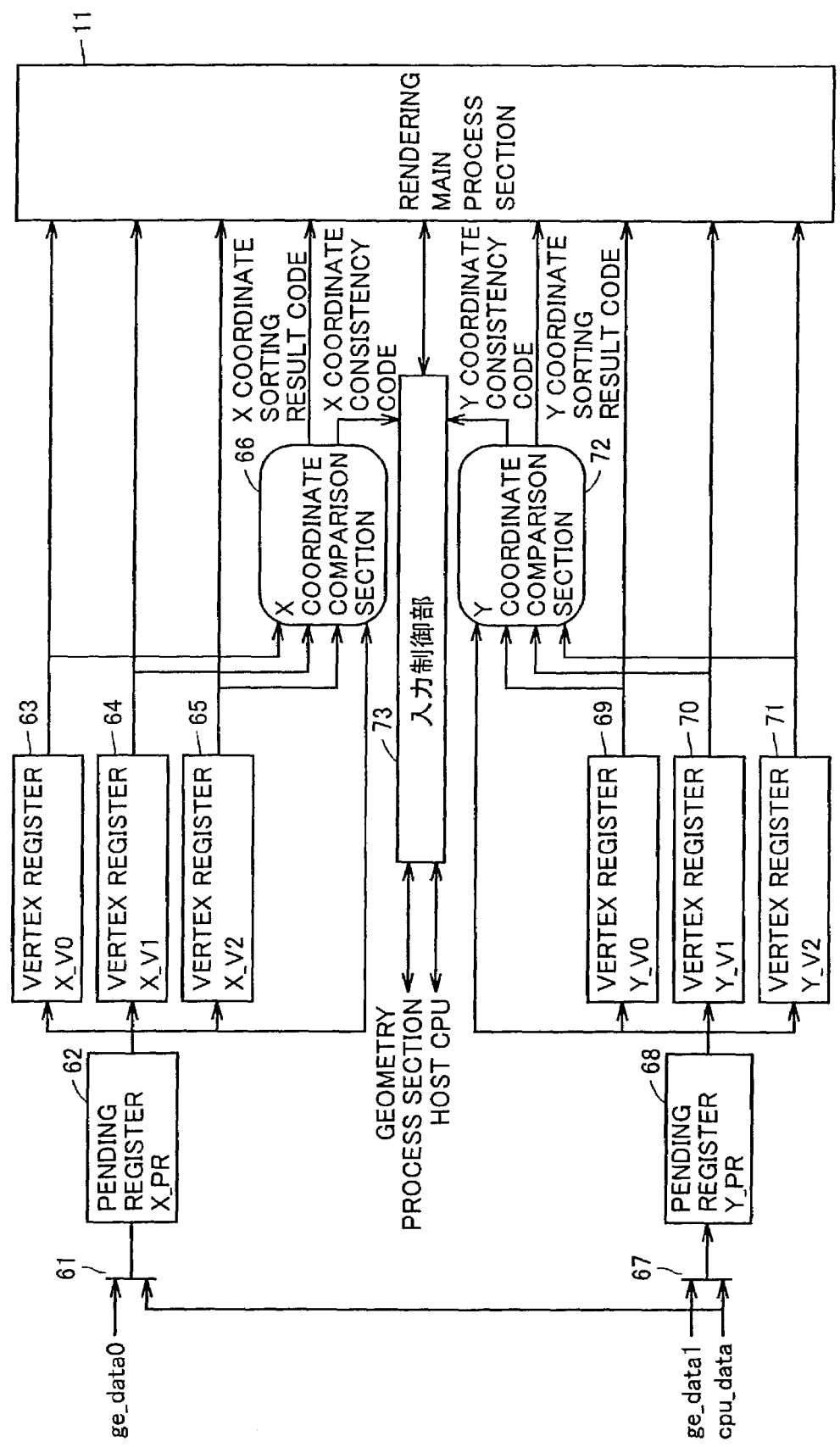
FIG. 16 is a block diagram showing schematic configurations of an X input section and a Y input section in a fifth embodiment according to the present invention.

FIG. 16 is a block diagram showing the schematic configurations of the X input section and the Y input section (to be referred to as "XY input section" hereinafter). This XY input section includes a selector 61 which selects one of data buses ge_data0 and cpu_data, a pending register X_PR 62 which temporarily holds an X coordinate value received from selector 61, vertex registers X_V0 to X_V2 (63 to 66) to which the X coordinate value held in pending register X_PR 62 is transferred, an X coordinate comparison section 66 which compares the X coordinate value held in pending registers X_PR 62 with that held in vertex registers X_V0 to X_V2 (63 to 66), a selector 67 which selects one of data buses ge_data1 and cpu_data, a pending register Y_PR 68 which temporarily holds a Y coordinate value received from selector 67, vertex registers Y_V0 to Y_V2 (69 to 71) to which the Y coordinate value held in pending register Y_PR 68 is transferred, a Y coordinate comparison section 72 which compares the Y coordinate value held in pending registers Y_PR 68 with that held in vertex registers Y_V0 to Y_V2 (69 to 71), and an input control section 73 which controls the input of data from host CPU 1 and geometry process section 2.

X coordinate comparison section 66 outputs an X coordinate sorting result code to rendering main process section 11 and outputs an X coordinate consistency code to input control section 73. In addition, Y coordinate comparison section 72 outputs a Y coordinate sorting result code to rendering main process section 11 and outputs a Y coordinate consistency code to input control section 73.

FIG. 17 is a view for explaining the configuration of each of X coordinate comparison section 66 and Y coordinate comparison section 72 (to be referred to as "coordinate comparison section" hereinafter). The coordinate comparison section includes selectors 74 and 75 each of which selects one of the coordinate values held in vertex registers V0 to V2 (X_V0 to X_V2 or Y_V0 to Y_V2) and pending register PR(X_PR or Y_PR), a comparator 76 which compares the coordinate value outputted from selector 74 with that outputted from selector 75, comparison result registers 77 to 79 each of which holds the comparison result of comparator 76, a sorting section 80 which performs sorting in accordance with the comparison results held in comparison result registers 77 to 79, a consistency determination section 81 which performs a consistency determination in accordance with the comparison results held in comparison result registers 77 to 79, and a sorting result code register 82 which holds a sorting result code from sorting section 80.

Selectors 74 and 75 select two out of the four coordinate values held in vertex registers V0 to V2 and pending register PR. Comparator 76 compares the two coordinate values selected by selectors 74 and 75 with each other, and outputs one bit representing "GreaterThan" and one bit representing "LessThan", i.e., two bits. The comparison result of comparator 76 is stored in one of V0V1 comparison result register 77, V1V2 comparison result register 78 and V2V0 comparison result register 79 depending on a combination of the compared vertex registers. The coordinate value held in pending register PR is inputted into selectors 74 and 75 for the following reason. If the vertex data is held in pending register PR, the vertex data can be processed before being transferred to one of vertex registers V0 to V2 and it is thereby possible to improve processing speed.

Sorting section 80 generates a sorting result code in accordance with the comparison result held in each of three comparison result registers 77 to 79, and stores the generated sorting result code in sorting result code register 82. In addition, consistency determination section 81 outputs a consistency code, indicating whether or not the comparison result held in comparison result registers 77 to 79 is consistent with one another, by one bit per combination of the comparison result registers, i.e., combination of vertexes.

FIG. 18 shows one example of sorting result codes outputted from sorting section 80. For example, if the magnitude relationship among the coordinate values satisfies "V0≦V1≦V2", sorting section 80 outputs a sorting result code "000".

FIG. 19 shows triangle strips rendered by the rendering process apparatus in the fifth embodiment according to the present invention. As shown in FIG. 19, if three triangles 0-1-2, 1-2-3 and 2-3-4 are to be rendered, vertexes 1 and 3 have exactly the same coordinate and triangle 1-2-3, therefore, becomes a straight line, making it unnecessary to render triangle 1-2-3. Accordingly, it suffices to instruct rendering main process section 11 to render only two triangles 0-1-2 and 2-3-4.

Figure 20:
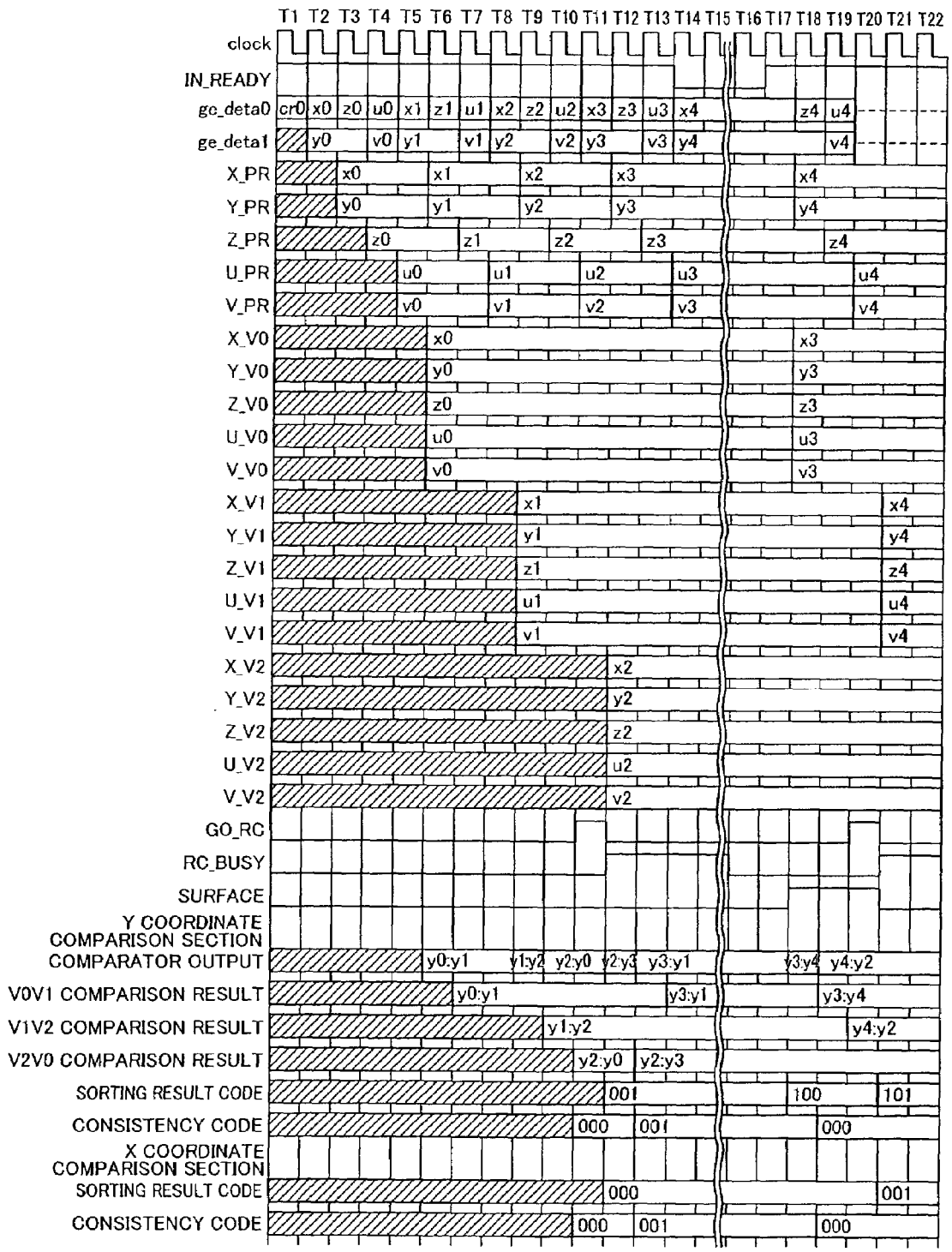
FIG. 20 is a timing chart for rendering process section 3 when the triangle strips shown in FIG. 19 are rendered.

FIG. 20 is a timing chart for rendering process section 3 if the triangle strips shown in FIG. 19 are rendered. Since X coordinate comparison section 66 and Y coordinate comparison section 72 are the same in operation, the outputs of comparator 76 and comparison result registers 77 to 79 of X coordinate comparison section 66 are not shown in the timing chart shown in FIG. 20.

In first cycle T1, since IN_READY signal is active (at H level), geometry process section 2 outputs control data (cr0) representing the types of primitives to be rendered (control data cr0 represents triangle strips in this case) and the types of element data to be used (control data cr0 represents that coordinates and texture coordinates are used in this case), to data bus ge_data0.

In cycle T2, input control section 12 inputs the control data outputted to data bus ge_data0. In addition, in cycles T2 to T5, element data x0, y0, z0, u0 and v0 of vertex 0 are written to pending registers X_PR, Y_PR, Z_PR, U_PR and V_PR, respectively. At this moment, since there are not coordinates of vertexes to be compared, X coordinate comparison section 66 and Y coordinate comparison section 72 do not operate.

In cycle T6, the element data of vertex 0 held in pending registers X_PR, Y_PR, Z_PR, U_PR and V_PR in which all the to-be-used element data of vertex 0 designated by control data cr0 have been completed are transferred to vertex registers X_V0, Y_V0, Z_V0, U_V0 and V_V0, respectively. At this moment, since the Y coordinate value of vertex 1 has been already held in the pending register, comparator 76 of Y coordinate comparison section 72 outputs a comparison result between coordinate values y0 and y1.

In cycle T7, the comparison result between y0 and y1 is written to V0V1 comparison result register 77.

In cycle T9, element data of vertex 1 held in pending registers X_PR, Y_PR, Z_PR, U_PR and V_PR are transferred to vertex registers X_V1, Y_V1, Z_V1, U_V1 and V_V1, respectively. At this moment, since the Y coordinate value of vertex 2 has been already held in the pending register, comparator 76 of Y coordinate comparison section 72 outputs a comparison result between coordinate values y1 and y2.

In cycle T10, the comparison result between y1 and y2 is written to V1V2 comparison result register 78. At this moment, comparator 76 of Y coordinate comparison section 72 outputs a comparison result between coordinate values y2 and y0.

In cycle T11, the comparison result between y2 and y0 is written to V2V0 comparison result register 79. At this moment, since the comparison results have been written to all of comparison result registers 77 to 79, respectively, sorting section 80 and consistency determination section 81 output a sorting result code and a consistency code, respectively. Since there are neither consistent X coordinate values nor consistent Y coordinate values, "000" is outputted as consistency codes for the X and Y coordinate values, respectively. At this moment, since it is necessary for rendering main process section 11 to render triangle 0-1-2, input control section 12 sets GO_RC signal to be active (at H level) and thereby instructs rendering main process section 11 to start processing the primitive (triangle 0-1-2).

In cycle T12, rendering main process section 11 starts rendering triangle 0-1-2. Rendering main process section 11 performs a raster processing to obtain the pixel values of triangle 0-1-2 on display section 4. Rendering main process section 11 selects the start point and the end point of the raster process from the vertex registers in accordance with the sorting result code. In addition, the sorting result code is written to sorting result code register 82. Since the magnitude relationship satisfies y0≦y2<y1, Y coordinate comparison section 72 outputs "001" as the Y coordinate sorting result. Further, since the magnitude relationship satisfies x0≦x1≦x2, X coordinate comparison section 66 outputs "000" as the X coordinate sorting result.

Furthermore, in cycle T12, coordinate values x3 and y3 of vertex 3 are written to pending registers X_PR and Y_PR, respectively. At this moment, comparator 76 of Y coordinate comparison section 72 compares coordinate values y2 and y3.

In cycle T13, the comparison result between y2 an y3 is written to V2V0 comparison result register 79. At this moment, comparator 76 of Y coordinate comparison section 72 compares coordinate values y3 and y1.

In cycle T14, the comparison result between y3 and y1 is written to V0V1 comparison result register 77. Since y3 is consistent with y1, consistency determination section 81 sets a bit corresponding to V0V1 comparison result register 77 at 1 and outputs "001" as the consistency code. In addition, the consistency code outputted from X coordinate comparison section 66 is "001", as well.

In cycle T16, rendering main process section 11 finishes the rendering process to triangle 0-1-2 and outputs L-level on RC_BUSY signal. However, since input control section 73 receives consistency code "001" from each of X coordinate comparison section 66 and Y coordinate comparison section 72, input control section 73 determines that triangle 1-2-3 is a straight line and does not instruct rendering main process section 11 to start rendering triangle 1-2-3.

In cycle T18, coordinate values x4 and y4 of vertex 4 are written to pending registers X_PR and Y_PR, respectively. At this moment, comparator 76 of Y coordinate comparison section 72 compares coordinate values y3 and y4.

In cycle T19, the comparison result between y3 and y4 is written to V0V1 comparison result register 77. At this moment, since y3 is not consistent with y4, consistency determination section 81 sets a bit corresponding to V0V1 comparison result register 77 at 0 and outputs "000" as the consistency code. A consistency code outputted from X coordinate comparison section 66 is "000", as well. In addition, comparator 76 of Y coordinate comparison section 72 compares coordinate values y4 and y2.

In cycle T20, the comparison result between y4 and y2 is written to V1V2 comparison result register 78. At this moment, since y4 is not consistent with y2, consistency determination section 81 outputs "000" as the consistency code. In addition, a consistency code outputted from X coordinate comparison section 66 remains "000", as well.

In cycle T20, since receiving consistency code "000" from each of X coordinate comparison section 66 and Y coordinate comparison section 72, input control section 73 determines that it is necessary to render triangle 2-3-4, sets GO_RC signal at H level and thereby instructs rendering main process section 11 to start rendering triangle 2-3-4. It is noted that in cycle T18, "100" is outputted as a Y coordinate sorting result. In addition, in cycle T21, "101" is outputted as a Y coordinate sorting result and "001" is outputted as an X coordinate sorting result.

In this way, the rendering process are performed only to triangles 0-1-2 and 2-3-4 shown in FIG. 19 and the rendering process for triangle 1-2-3 is not performed.

As stated so far, according to the rendering process apparatus in this embodiment, since the coordinate values held in the pending registers and the vertex registers are compared to make a consistency determination, it is possible to prevent the rendering process from being performed to an unnecessary primitive and to thereby improve the processing speed of the overall graphics system.

Further, since the coordinate values held in the pending registers and the vertex registers are compared to perform a sorting process, it is possible to perform the sorting process in parallel to the write of data by host CPU 1 or geometry process section 2 and to thereby reduce processing load imposed on rendering main process section 11.

Sixth Embodiment

A rendering process apparatus in the sixth embodiment according to the present invention differs from that in the first embodiment shown in FIGS. 2 and 3 in the configurations of element data input sections 13 to 21. Therefore, overlapped configurations and functions will not be repeatedly described herein in detail.

Figure 21:
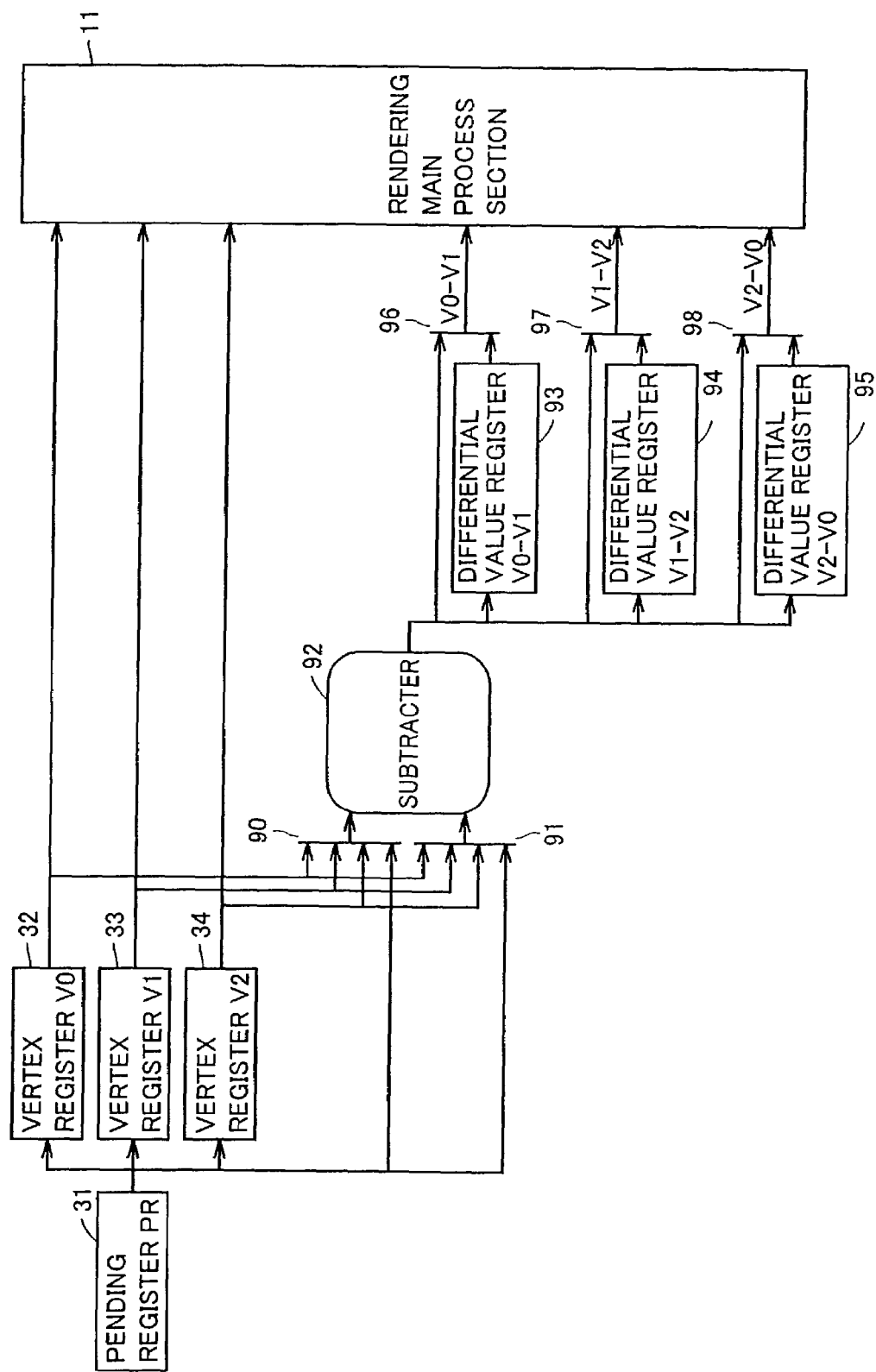
FIG. 21 is a block diagram showing schematic configurations of each of element data input sections 13 to 21 in a sixth embodiment according to the present invention.

FIG. 21 is a block diagram showing the schematic configuration of each of element data input sections 13 to 21 in the sixth embodiment according to the present invention. This element data input section includes a pending register PR 31 which temporarily holds element data outputted to one of data buses ge_data0 (ge_data1) and cpu_data, vertex registers V0 to V2 (32 to 34) to which the element data held in pending register PR31 is transferred, selectors 90 and 91 each of which selects one of the element data held in pending register PR31 and vertex registers V0 to V2 (32 to 34) and which outputs the selected element data, a subtracter 92 which subtracts the element data received from selector 91 from the element data received from selector 90, differential value registers 93 to 95 each of which holds the subtraction result of subtracter 92, and selectors 96 to 98 which select one of the subtraction result outputted from subtracter 92 and the subtraction results held in differential value registers 93 to 95 and which output the selected subtraction result, respectively.

Selectors 90 and 91 select two from the four element data held in vertex registers V0 to V2 (32 to 34) and pending register PR31, respectively. Subtracter 92 calculates the difference between the two element data selected by selectors 90 and 91, respectively, and stores the calculated difference in one of differential value registers V0–V1 (93), V1–V2 (94) and V2–V0 (95) depending on a combination of the vertex registers for which the difference is calculated.

FIG. 22 is a timing chart for rendering process section 3 in this embodiment when the triangle strips shown in FIG. 4A are rendered. This timing chart shows a case where only XYZ coordinates and texture coordinates are used as the types of element data to be used.

In the timing chart shown in FIG. 22, since the timing other than that of subtracter 92, differential value register V0–V1 (93), differential value register V1–V2 (94) and differential value register V2–V0 (94) is the same as that for rendering process section 3 in the first embodiment shown in FIG. 5, it will not be repeatedly described herein in detail. While a case where subtracter 92 performs subtraction for the U components of the texture coordinates will be described herein, the same thing is true for the other operations.

In cycle T6, when all the element data of vertex 0 have been written to the pending registers, these element data are transferred to vertex registers 0, respectively. At this moment, two U components are not obtained yet for subtraction, subtracter 92 does not perform subtraction.

In cycle T8, when the U coordinate value u1 of vertex 1 is written to pending register PR, subtracter 92 calculates the difference between U coordinate value u0 held in vertex register V0 and U coordinate value u1 held in pending register PR, and outputs the calculated difference to differential value register V0–V1 (93). In cycle T9, differential value u0–u1 outputted from subtracter 92 is transferred to differential register V0–V1 (93).

In cycle T11, when the U coordinate value u2 of vertex 2 is written to pending register PR, subtracter 92 calculates the difference between U coordinate value u1 of vertex 1 held in vertex register V1 and U coordinate value u2 held in pending register PR and outputs the calculated difference to differential value register V1–V2 (94). At this moment, input control section 12 sets GO_RC signal to be active (at H level) and thereby instructs rendering main process section 11 to start processing the primitive.

In cycle T12, differential value u1–u2 outputted from subtracter 92 is transferred to differential value register V1–V2 (94). At this moment, subtracter 92 calculates the difference between U coordinate value u2 of vertex 2 held in vertex register V2 and U coordinate value u0 held in vertex register V0 and outputs the calculated difference to differential value register V2–V0 (95). Selector 98 selects the output from subtracter 92 and outputs the selected output to rendering main process section 11, by which time all the three differential values for triangle 0-1-2 have been inputted into rendering main process section 11.

Rendering main process section 11 requires data differential values among the vertexes to render the primitive. Rendering main process section 11, therefore, interpolates the positions and values of pixels among the vertexes and in the primitive region based on three differential values V0–V1 (u0–u1), V1–V2 (u1–u2) and V2–V0 (u2–u0) outputted from the element data input sections.

In cycle T14, U coordinate value u3 of vertex 3 is written to pending register V_PR. Since rendering main process section 11 is using the differential value data, differential value registers 93 to 95 are not updated.

In cycle T16, when rendering main process section 11 completes with the rendering process to triangle 0-1-2, rendering main process section 11 outputs L-level on RC_BUSY signal. In cycle T17, input control section 12 sets GO_RC signal at H level to thereby instruct rendering main process section 11 to start rendering triangle 1-2-3, and subtracter 92 calculates the differential value between U coordinate value u2 held in vertex register V2 and U coordinate value u3 held in pending register U_PR and outputs the calculated differential value to differential value register V2–V0 (95).

In cycle T18, differential value u2–u3 is transferred to differential value register V2–V0 (95). At this moment, subtracter 92 calculates the differential value between U coordinate value u3 of vertex 3 held in vertex register V0 and U coordinate value u1 of vertex 1 held in vertex register V1, and outputs the calculated differential value to differential value register V0–V1 (93). Selector 96 selects the output from subtracter 92 and outputs the selected output to rendering main process section 11, by which time all the three differential values for triangle 1-2-3 have been inputted into rendering main process section 11.

Thereafter, the same process is performed. Namely, in cycle T23, all the differential values for triangle 2-3-4 are inputted into rendering main process section 11. In the above description, the differential values of the coordinate values of texture coordinates are calculated and outputted to rendering main process section 11. Alternatively, the differential values of XYZ coordinate values or color data may be calculated and outputted to rendering main process section 11.

As stated so far, according to the rendering process apparatus in this embodiment, the differential values between the coordinate values or the color data held in the pending registers and the vertex registers are calculated and outputted to rendering main process section 11. This makes it unnecessary for rendering main process section 11 to calculate these differential values, thereby making it possible to reduce processing load imposed on rendering main process section 11 and to, therefore, improve the processing speed of the overall graphics system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rendering process apparatus comprising:
   a rendering main process section performing a rendering process in accordance with vertex data;
   an input section inputting the vertex data from an outside to said rendering main process section as the vertex data for rendering process; and
   an input control section controlling an output of the vertex data inputted into said input section, and controlling the rendering process performed by said rendering main process section, wherein
   said input section includes:
   a pending register holding the vertex data inputted from said outside; and
   a plurality of vertex registers to which the vertex data held in said pending register is transferred.

2. The rendering process apparatus according to claim 1, wherein
   said input control section receives control data representing a type of a primitive to be rendered and a type of element data to be used, controls the output of the vertex data inputted into said input section, and controls the rendering process performed by said rendering main process section in accordance with the control data.

3. The rendering process apparatus according to claim 2, wherein
   said input control section refers to the type of the element data included in said control data, and transfers the element data to one of said plurality of vertex registers when all the element data of a vertex are written to said pending register.

4. The rendering process apparatus according to claim 2, wherein
   if said control data is updated before all the element data of a vertex are written to said pending register, said input control section cancels the element data of said vertex.

5. The rendering process apparatus according to claim 2, wherein
   if element data of a second vertex is written to said pending register before all element data of a first vertex are written to said pending register, said input control section cancels the element data of said first vertex.

6. The rendering process apparatus according to claim 2, wherein
   cupon outputting an instruction to render one of a triangle strip and a triangle fan to said rendering main process section, said input control section outputs a code representing a direction of a face of a triangle to said rendering main process section.

7. The rendering process apparatus according to claim 2, wherein
   upon outputting an instruction to render one of a line and a point to said rendering main process section, said input control section outputs a code representing that rendering is performed using which of said plurality of vertex registers, to said rendering main process section.

8. The rendering process apparatus according to claim 1, wherein
   said input section includes:
   a pending register holding the vertex data with a plurality of pieces of element data included in one data word length inputted from said outside; and
   a plurality of vertex registers to which the plurality of pieces of element data held in said pending register are transferred.

9. The rendering process apparatus according to claim 1, wherein
   said input section includes:
   a pending register holding the vertex data inputted from said outside;
   an operation section operating the vertex data held in said pending register; and
   a plurality of vertex registers to which the vertex data after being operated by said operation process section is transferred.

10. The rendering process apparatus according to claim 9, wherein
    said operation process section performs a clamp process to the vertex data held in said pending register.

11. The rendering process apparatus according to claim 9, wherein
    said operation process section performs offset addition to the vertex data held in said pending register.

12. The rendering process apparatus according to claim 9, wherein
said operation process section performs data format conversion to the vertex data held in said pending register.

13. The rendering process apparatus according to claim 1, wherein
said input section includes:
a pending register holding coordinate values inputted from the outside;
a plurality of vertex registers to which the coordinate values held in said pending register are sequentially transferred; and
a coordinate comparison section comparing magnitudes of the coordinate values transferred to said plurality of vertex registers, and outputting a sorting result code to said rendering main process section.

14. The rendering process apparatus according to claim 1, wherein
said input section includes:
a pending register holding coordinate values inputted from the outside;
a plurality of vertex registers to which the coordinate values held in said pending registers are sequentially transferred; and
a coordinate comparison section detecting whether the coordinate values transferred to said plurality of vertex registers are consistent, and wherein
if said coordinate comparison section detects that the coordinate values are consistent, said input control section does not output an instruction to render one of a line and a triangle serving as a rendering target, to said rendering main process section.

15. The rendering process apparatus according to claim 1, wherein
said input section includes:
a pending register holding coordinate values inputted from the outside;
a plurality of vertex registers to which the coordinate values held in said pending registers are sequentially transferred; and
a subtracter calculating a difference between the coordinate values transferred to said plurality of vertex registers, and outputting the calculated difference to said rendering main process section.

* * * * *